United States Patent [19]
Edelman

[11] Patent Number: 6,085,174
[45] Date of Patent: Jul. 4, 2000

[54] COMPUTER ASSISTED AND/OR IMPLEMENTED PROCESS AND ARCHITECTURE FOR ADMINISTERING AN INVESTMENT AND/OR RETIREMENT PROGRAM

[76] Inventor: Ric Edelman, 12450 Fair Lakes Cir., Suite 200, Fairfax, Va. 22033

[21] Appl. No.: 08/936,020

[22] Filed: Sep. 23, 1997

[51] Int. Cl.[7] ................................................ G06F 17/60
[52] U.S. Cl. ............................. 705/36; 705/37; 705/38; 705/35
[58] Field of Search .............................. 705/36, 37, 38, 705/35, 40; 283/57

[56] References Cited

U.S. PATENT DOCUMENTS

| | | | |
|---|---|---|---|
| 4,346,442 | 8/1982 | Musmanno | 705/36 |
| 4,376,978 | 3/1983 | Musmanno | 705/36 |
| 4,722,055 | 1/1988 | Roberts | 705/36 |
| 4,752,877 | 6/1988 | Roberts et al. | 705/36 |
| 4,953,085 | 8/1990 | Atkins | 705/36 |
| 5,214,579 | 5/1993 | Wolfberg et al. | 705/36 |
| 5,689,649 | 11/1997 | Altman et al. | 705/36 |
| 5,775,734 | 7/1998 | George, Jr. | 283/57 |
| 5,802,500 | 9/1998 | Ryan et al. | 705/36 |
| 5,809,484 | 9/1998 | Mottola et al. | 705/38 |
| 5,839,118 | 11/1998 | Ryan et al. | 705/36 |

OTHER PUBLICATIONS

"The Truth About Money", by R. Edelman, 1996.

*Primary Examiner*—Allen R. MacDonald
*Assistant Examiner*—Jagdish Patel
*Attorney, Agent, or Firm*—Irah H. Donner; Pepper Hamilton LLP

[57] ABSTRACT

A computer program product stores computer instructions therein for instructing a computer to perform a process of administering or assisting in the administration of resources of a customer for the benefit of a beneficiary. The program product includes a recording medium readable by the computer, and computer instructions stored thereon instructing the computer to perform the process. The instructions and the process include receiving a request from the customer to administer the resources in accordance with predetermined criteria, and storing customer related data associated with the customer. The instructions and process also include determining a predetermined period of time based on an age of the beneficiary at which withdrawals do not incur a tax penalty, and administering the resources in an annuity investment growing tax deferred in accordance with withdrawal criteria, and preventing withdrawal of the resources responsive to the withdrawal criteria.

13 Claims, 22 Drawing Sheets

$100,00 INVESTED AT 10% FOR 10 YEARS IN A RISING TAX RATE ENVIRONMENT

| YEAR | TAX RATE | VALUE OF TAXABLE ACCOUNT | AFTER-TAX YIELD 30% | VALUE OF TAX-DEFERRED ACCOUNT | AFTER-TAX YIELD |
|------|----------|--------------------------|---------------------|-------------------------------|-----------------|
| 1    | 30%      | 107,000                  | 7.0%                | 110,000                       | 10%             |
| 2    | 30%      | 114,490                  | 7.0%                | 121,000                       | 10%             |
| 3    | 35%      | 121,931                  | 6.5%                | 133,100                       | 10%             |
| 4    | 40%      | 129,246                  | 6.0%                | 146,410                       | 10%             |
| 5    | 45%      | 136,354                  | 5.5%                | 161,051                       | 10%             |
| 6    | 50%      | 143,171                  | 5.0%                | 177,156                       | 10%             |
| 7    | 50%      | 150,330                  | 5.0%                | 194,817                       | 10%             |
| 8    | 50%      | 157,846                  | 5.0%                | 214,353                       | 10%             |
| 9    | 50%      | 165,739                  | 5.0%                | 235,794                       | 10%             |
| 10   | 50%      | 174,026                  | 5.0%                | 259,374                       | 10%             |

IF YOU WITHDRAW A LUMP SUM:

NET VALUE OF TAXABLE FUND   $174,026

GROSS VALUE OF TAX DEFERRED FUND   $259,347
ORIGINAL PRINCIPAL   $100,000
TAXABLE PROFIT   $159,374
LESS 50% TAX   ($79,687)
NET VALUE OF TAX-DEFERRED FUND   $179,687

IF YOU TAKE A 10% INCOME STREAM:

| NET VALUE | $174,026 | | NET VALUE | $259,374 |
| INCOME | x 10% | | INCOME | x 10% |
|  | 17,400 | |  | 25,937 |
| LESS 50% TAX | (8,701) | | LESS 50% TAX | (12,968) |
| NET ANNUAL INCOME | $8,701 | | NET ANNUAL INCOME | $12,968 |

FIG. 9

COMPUTER ASSISTED AND/OR IMPLEMENTED PROCESS AND ARCHITECTURE FOR ADMINISTERING AN INVESTMENT AND/OR RETIREMENT PROGRAM

BACKGROUND OF THE INVENTION

1. Field of the Invention

The present invention generally relates to a computer assisted and/or implemented process and architecture for administering an investment and/or retirement program, and more particularly, to a computer assisted and/or implemented process and architecture for administering an investment and/or retirement program to maximize the investment and investment performance, and to minimize government obligations (e.g., taxes) associated therewith.

2. Background of the Related Art

Retirees generally have three primary sources of income: pensions, savings they have accumulated in their company retirement plans, and Social Security.

Pensions are technically called defined benefit plans. Through them, your employer promises to give you a specific monthly income (or in some cases, a lump-sum check in lieu of a monthly income) starting at retirement. The amount you receive is calculated by a formula that considers your salary, the number of years you have worked for the company, and other factors. The formula may be different at every company.

Most workers entitled to a pension at retirement are offered several options regarding how to collect the benefit. The two most common options are single life annuity (which gives you a monthly income for life, but which stops upon your death) and joint and survivor annuity (which provides you with a smaller monthly income but which continues as long as either you or your spouse is alive).

All retirement plans—whether individual or company-sponsored—offer two major benefits:

You do not pay taxes on any of the money that is contributed to the plan until you begin withdrawals, and Any interest, dividends, or capital gains that accumulate in the plan are tax-deferred until withdrawal.

An IRA is the most common type of retirement plan. These are maintained individually rather than in groups. With any retirement plan, you know how much money is being placed into the plan, but you have no idea how much the plan will be worth when you retire. Thus, retirement plans are technically known as defined contribution plans, and they are the exact opposite of defined benefit plans, where the result is known but the amount that needs to be contributed is not.

Like all retirement plans, including those established by companies for their employees, you do not pay taxes on any of the money that is contributed to the IRA until you begin to make withdrawals, and any interest, dividends, or capital gains that accumulate in the plan also are tax-deferred until withdrawal.

Company retirement plans generally involve either a Simplified Employee Pension Plan or the 401(k) plan.

If you have any self-employment income, from baby-sitting to shooting wedding videos, you may qualify for a Simplified Employee Pension Plan, known as a SEP-IRA. SEPs are as easy to use as IRAs and almost identical as well. But they offer one major advantage over IRAs: instead of being limited currently to a $2,000 annual deductible contribution, you can put away 15% of your self-employment income, currently up to $22,500. You are permitted to do this even if you or your spouse participate in another pension or retirement plan.

SEPs involve minimal disclosure and reporting requirements. You can contribute different amounts from year to year, and you can currently wait until April 15 to contribute for the previous year (or later if you file an extension). Other plans must be established by December 31.

Although the law says you can place up to 15% of your net taxable income into a SEP-IRA, the correct figure is really 13.04%. The reason is as follows: Say your net taxable income (that is your profit minus expenses) is $10,000. Fifteen percent would be $1,500, which you'd place into a SEP-IRA. But that would reduce your net taxable income to $8,500—and $1,500 of $8,500 is 17.65%—meaning you've contributed too much to the SEP, leading to major headaches with the IRS. Thus, the correct amount you would be permitted to place into your SEP would be $1,304, which is only 13.04% of $10,000.

The 401(k) plan—so-named by the tax code section that created it—is offered by more companies that any other type of retirement plan. There are generally four contribution methods for 401(k) plans.

Method #1: The Employer's Basic Contribution

This contribution usually is a percentage of payroll. For example, Ken, 45, makes $40,000 a year and his company contributes 1% of his pay to the 401(k) plan every year. Although the money is Ken's, he is not taxed on it, and the money grows tax-deferred inside the plan.

Method #2: The Employee's Voluntary Contribution

Depending on where you work, you may be permitted to contribute up to 15% of your pay. For example, Ken is allowed to invest up to 5% of his paycheck into the 401(k) plan. He gets a tax deduction for the amount he contributes, and like the employer's contribution above, this money grows tax-deferred.

Method #3: The Employer's Matching Contributions

Through this method, the company contributes a percentage of what the employee contributes. For example, Ken's company adds 25 cents to the plan for every dollar that Ken puts in himself. This increases Ken's stake by 25%, yet he is not taxed on this money, and it too grows tax-deferred until he retires.

Method #4: The Employer's Profit-Sharing Contribution

This is an additional contribution that the company voluntarily makes each year based on the firm's profits. For example, Ken's company typically gives Ken a bonus equal to 3% of his pay, which is deposited into the plan on Ken's behalf. Like the other contributions, this one too is not taxed and it grows tax-deferred.

Thus, of the four ways money goes into a 401(k), only one comes from the employee—making these plans a great deal for workers! All told, Ken contributes $2,000 of his own pay to the 401(k), a contribution that costs him only $1,340 because the contribution entitles Ken to a tax deduction that saves him $660 in taxes. On top of that, Ken's employer adds another $2,100—$400 in basic, $500 in matching and $1200 in profit-sharing contributions—and all of it is in pre-tax dollars which grow tax-deferred. Thus, for every dollar Ken contributes to his 401(k), his employer contributes $1.05. Put another way, for a $1,340 investment, Ken's account is worth $4,100—and that's before his account earns a penny from interest, dividends, or capital gains!

Another primary source of retirement income is Social Security. Under current law, the maximum Social Security benefit for a worker and spouse is $22,464 per year.

Therefore, even if Social Security continues as is, it alone is not likely to provide you with a comfortable retirement.

The current age to be eligible for full Social Security benefits is currently 65. But that is only for workers nearing retirement. For younger workers, Congress already has cut back the benefits. For example, those born after 1959 are not eligible for full Social Security benefits until age 67. (They can start receiving benefits at 62, but they will get 30% less than if they wait until 67, not 20% less like those retiring today.)

Even though everyone Social Security, pensions and retirement plans are, they are not enough to satisfy your retirement income needs. Yet many workers who are covered by these programs often have terrible personal savings records. Many are in for a shock when they discover at retirement that their retirement income is a fraction of their pre-retirement pay.

For example, workers earning $50,000 a year who plan to retire with nothing but a pension and Social Security can expect their income to drop 36% the day they retire. That's right: they will get pensions worth only 44% of pre-retirement pay and Social Security will provide only another 20%. FIG. 1 is an illustration of a typical retirement benefit when the final pay is $50,000. Could you afford a 36% pay cut right now? If you cannot, what makes you think you will be able to afford such a large cut at retirement?

The retirement situation is even worse for higher-paid workers. If your final pay is $150,000, pensions and Social Security together will replace only 36% of your income. You will lose a whopping 61% of your income when you retire! FIG. 2 is an illustration of a typical retirement benefit when the final pay is $150,000. If you are thinking that is not a problem for you because you don't earn anywhere near $100,000, think again: if you and your spouse jointly earn $50,000 today, a mere 4% annual pay increase over the next 20 years will place your income about $100,000, as illustrated in FIG. 3. So, as important as it is that you participate in your company retirement plan, you need to save even more.

As discussed above, the above retirement programs are generally insufficient to adequately fund or support an individual after retirement, and supplemental investment vehicles or programs are required to cover these additional costs.

For example, one significant cost that is generally not covered by retirement programs is the cost of college for children that enter college after their parents have retired. The cost of college is so significant, that different types of investment programs have emerged to fund the cost of college. These investment programs are designed to fund the cost of college based on long term savings.

For example, U.S. Pat. No. 4,722,055 to Roberts, incorporated herein by reference, relates to methods and apparatus for funding a future liability by means of an insurance investment program. The system estimates the expected cost of the liability when the liability is expected to occur and computes the present value of each unit of insurance needed to yield that expected cost at maturity. The system also aids the insurance fund manager in making decisions regarding investment of fund assets in order to meet present and future obligations of the fund.

FIG. 4 is a flowchart of the computer process for funding a future liability in the Roberts patent. In FIG. 4, the customer transaction operations performed at the point-of-sale stations include blocks 11–14. Customer transactions can be purchases, payouts, or redemptions of fund units. Unit purchase data is entered at block 11, unit payout data is entered at block 12, and unit redemption data is entered at block 13. Each entry includes the customer's name and account number and the transaction amount. The entered transaction data is stored at block 14 for transmission to the central processing facility.

The transaction data accumulated at the point-of-sale stations is transmitted periodically (e.g., daily) to the central processing facility. The data for each incoming transaction is processed individually in a loop beginning with block 15 and ending at block 25 where all transactions in a batch (e.g., a day) are totalled prior to further processing as a group in accordance with block 26 et seq. The incoming transaction data is first subjected to test 15 which determines whether the transaction is a purchase (NO output) or a redemption (YES output).

If the transaction is a purchase, the system flow passes to test 21 which determines if the purchase is the first transaction in a new account or an additional transaction in an existing account. For new accounts the system flow passes to block 22 which creates a new entry in the account list based on the transaction data. Transaction data for both new and existing accounts then passes to block 23 which checks the transaction data for possible errors in calculation at the point-of-sale station.

If the transaction is a payout or a withdrawal, data flow moves from test 15 to block 16 where the transaction data is verified to confirm that it is from a valid account. The account information necessary to verify the transaction data is supplied from the account list stored in the system's master file, shown at block 17. Thereafter, the data flow passes to test 18, which determines whether the transaction is a payout (withdrawal at maturity) or a redemption (withdrawal before maturity). Payout transaction data passes to verification block 23. For redemption transactions, the redemption before maturity penalty (RBMP) must be calculated. This is accomplished at block 19.

The RBMP calculation is based on the current value of an insurance unit which is a function of the present college cost data. The college cost data is supplied from one of the system's data files shown at block 20. From the RBMP calculation, system flow for redemption transactions also passes to verification block 23 which checks for possible errors made at the point-of-sale station.

From verification block 23, system flow passes to block 24, where each transaction is recorded in the system's master file, and the customer account list data is updated. Thereafter, system flow passes to block 25, where purchase, payout, and redemption transactions are totalled. Next, system flow passes to block 26, where the current spread calculation is carried out to create an updated schedule of the current charge to customers for insurance units based on the prevailing college cost and inflation rate data. The updated schedule of current charges is transmitted to the point-of-sale stations. There, the schedule is used by the salesmen to provide cost information to customers and to set the cost for unit purchases, unit payouts, and unit redemptions.

System flow then proceeds to block 27 which carries out the update asset position operation to determine what investment transactions should be made in the fund investment portfolio based on current and projected customer transactions. The data processing system advises the fund manager of its determination concerning the net amount of required investment transactions and provides a list of the investments which might be suitable for purchase or sale. Based on this information, the manager can choose the investment transactions to be made and enter the investment transaction data into the system.

After the investment transaction data is entered, system flow passes to block 28, where a report is created for the investment manager which details the changes made during the period, including the transaction totals for the period, the fund assets purchased and sold, the projection of the cash flow requirements for customer transactions, the projection of the cash flow generated from the fund assets, etc. Next, system flow passes to block 29, where the system periodically (e.g., annually) prepares a tax liability statement for each customer and for the fund manager. Also, at block 30, the system prepares another periodic report (e.g., quarterly) to provide the customer with current account information.

Another prior method, U.S. Pat. No. 4,752,877 to Roberts et al., incorporated herein by reference, is an insurance investment plan that is implemented using a floating rate zero coupon note for funding a future liability. FIGS. 5–7 are flowcharts illustrating the computer process for funding a future liability using a floating rate zero coupon note. In FIGS. 5–7, at the beginning of each period certain variables used in the data processing system must be initialized (block 101). These variables include: the number of transactions during the day (TDAY), the number of transactions during the period (TPERIOD), the number of contracts sold during the day (DSALES), the number sold during the period (PSALES), the number redeemed during the day (DRDMP), the number redeemed during the period (PRDMP), the number of floating rate zero coupon notes of each maturity M (FRZCN(M)), and the number of each maturity sold during the day (DSFRZCN(M)), sold during the period (PSFRZCN(M)), redeemed during the day (DRFRZCN(M)), and redeemed during the period (PRFRZCN(M)).

Customers interact with the system at point-of-sale stations. These can be located at remote points limited only by the ability to communicate electronically with the central computer. Orders and customer inquiries are collected at the point-of-sale stations (block 102). The customer first enters his name (NAME) and account number (NUMBER), or if he does not have an account, indicates that a new account is to be opened. The customer then enters an order or inquiry (referred to generically at block 102 as DATA). A customer may submit a purchase order (block 103) or a redemption order (block 104) or may simply inquire as to the status of his or her account (block 105). Transaction requests include an identification of the floating rate zero coupon note to be purchased or redeemed and the transaction amount (referred to generically at blocks 103 and 104 as CONTRACT). Inquiries specify the particular information items requested. These orders are transmitted to the central computer, and information regarding transactions, floating rate zero coupon note prices, and account status are received back from the central computer and displayed on a CRT terminal (block 106). Alternatively, purchase orders and redemption orders could be stored at block 106 and transmitted periodically (e.g., daily) to the central computer for processing. At the conclusion of each transaction, a customer can request a printed confirmation record of the transaction (block 107).

Each customer request is processed individually in a loop beginning with test 108 and ending at block 125. The incoming request is first subjected to test 108. If the dollar amount of the transaction (AMOUNT) is equal to zero, the request is an inquiry, which is referred to blocks 109–111 for processing. The status of the account is checked at block 109. Information the customer requested is retrieved from the master account file at block 110 and the response is transmitted to the investor in block 111. The requested information is displayed on the CRT terminal.

If AMOUNT is not equal to 0, the customer request passes to test 112. If AMOUNT is less than 0, the request is a redemption request, and the system flow passes to block 113. At block 113 the account information is verified by checking the master account file at block 114 to make sure that the account is valid and that it contains the floating rate zero coupon notes the customer wishes to sell. When the account information has been verified, data flow moves to test 115 where it is determined whether or not the customer is requesting early withdrawal—i.e., redemption prior to the scheduled maturity date of the floating rate zero coupon note. If so, the early withdrawal penalties are first calculated at block 116. Otherwise control passes directly to block 117 where the redemption value for each of the floating rate zero coupon notes the account holder wishes to redeem is calculated.

The calculation of the redemption value for a floating rate zero coupon note is based on the periodic escalation rates in the cost of the service or commodity giving rise to the liability being funded-e.g., college tuition-over the life of the floating rate zero coupon note and involves a downward adjustment for any early withdrawal penalties. The current value of the floating rate zero coupon note is calculated by escalating the base value of the floating rate zero coupon note at the date of purchase at the rates of escalation in the cost of college between the date of purchase and the date of redemption and adding the unamortized premium or subtracting the unaccredited discount, as appropriate. These escalation rates are taken from the master file of escalation rates in U.S. college costs at block 118. After the redemption value has been calculated, the amount of cash that will have to be paid to the account holder is subtracted from the amount of cash in the system at block 119. Control then passes to block 123.

If instead AMOUNT is greater than 0, the request is either a purchase request or an installment payment relating to an earlier purchase. In that case, control passes from test 112 to test 120, which determines whether the request pertains to a new account. If so, a new account is opened at block 121. Otherwise control passes to block 122 where the amount of the cash payment is added to the amount of cash in the system.

Transaction data for both redemptions and purchases then pass to block 123 which checks the transaction data for possible errors in calculation at the point-of-sale station. From verification block 123, system flow passes to block 124 where each transaction is recorded in the system's master account file and master transaction file. Thereafter, system flow passes to block 125, where the floating rate zero coupon note liability schedule is updated to reflect purchases or redemptions.

Next, system flow passes to test 126, which determines whether all the transactions for the particular day in question have been processed. If not, system flow passes back to the beginning of the loop to receive the next customer request. If it is the end of the day and all transactions for the day have been processed, control passes to block 127, which prepares the next day's schedule of floating rate zero coupon note prices.

System flow then proceeds to block 128, which carries out the update asset portfolio operation to determine the updated investment portfolio based on current and projected customer transactions, the aggregate maturity schedule for the floating rate zero coupon notes, the amount of cash available for investment, projected interest rates, the current composition of the asset portfolio, and the portfolio investment criteria supplied by the fund manager.

After the investment transaction data are entered, system flow passes to block 129 where a daily transaction report is prepared for the investment manager. This report summarizes the transactions that took place during the day; provides the end-of-day asset and liability position; furnishes the portfolio yield, investment yield, and composite cost of the floating rate zero coupon note liabilities, all on a semi-annual-equivalent-yield basis; and indicates the projected income flows from the updated asset portfolio and the projected stream of floating rate zero coupon note liabilities. Then at block 130 the variables that measure each day's activity are reinitialized for the beginning of the next day.

Next system flow passes to test 131 where it is determined whether the day in question is the last day of the current period. If not, system flow passes to block 138. If it is the last day of the period, system flow passes to block 132 where the end-of-period investment performance report is prepared. This report provides various measures of investment performance which the fund manager can use to monitor the profitability of the investment program adopted during the period. In addition, it is calculated in block 132 whether the fund is overfunded or underfunded and the amount of any overfunding or underfunding. A significant underfunding would signal to the fund manager the need to find higher yielding investments in the asset portfolio in order to avoid the danger of failing at some point to have sufficient cash to meet maturing floating rate zero coupon note liabilities.

Next system flow passes to block 133 where the system periodically (e.g., quarterly) calculates for each account holder the amount of investment income and the amount of taxable income earned during the period on the floating rate zero coupon notes in his or her account. At block 134 the system prepares end-of-period reports for mailing to account holders. System flow then passes to block 135 where the end-of-period financial statements are prepared drawing on information that has been recorded in the accounting files at block 136 during the period. System flow then moves to block 137 where the variables that measure each period's activity are reinitialized for the beginning of the next period.

Next system flow passes to block 138 where at the end of each day the daily transaction summary and summary of current position are transmitted to the fund manager and at the end of each period the investment performance and position report and the end-of-period financial statements are transmitted to the fund manager.

Thus, both the Roberts and Roberts et al. patents are related to a specific procedure for estimating the expected cost of the liability when the liability is expected to occur, and computing the present value of each unit of insurance needed to yield that expected cost at maturity. However, these patents do not solve the problem of administering and/or managing a program that attempts to optimize or maximize retirement and/or investment resources.

In addition, the Roberts and Roberts et al. patents do not solve the problem of implementing a program designed specifically for managing and/or administering retirement and/or investment resources. Further, the Roberts and Roberts et al. patents do not solve the problem of ensuring that the retirement and/or investment resources are not prematurely diverted, thereby compromising or jeopardizing the administration of retirement and/or investment resources.

The Roberts and Roberts et al. patents also do not solve the problem of tracking the performance of the retirement and/or investment resources, while also managing reports on the performance of the retirement and/or investment resources, in a distributed data base environment. Further, the Roberts and Roberts et al. patents also do not solve the problem of tracking the performance of resources, while also managing reports on the performance of the resources, in a distributed computing environment, such as over the internet and/or intranet and/or private networks.

Accordingly, it is desirable to administer and/or manage a program that attempts to optimize or maximize retirement and/or investment resources. It is also desirable to implement a program designed specifically for managing and/or administering retirement and/or investment resources. It is also desirable to ensure that the retirement and/or investment resources are not prematurely diverted, thereby compromising or jeopardizing the administration of retirement and/or investment resources.

It is further desirable to track the performance of the retirement and/or investment resources, while also managing reports on the performance of the retirement and/or investment resources, in a distributed data base environment. It is also desirable to track the performance of resources, while also manage reports on the performance of the resources, in a distributed computing environment, such as over the internet and/or intranet and/or private networks.

SUMMARY OF THE INVENTION

It is a feature and advantage of the present invention to administer and/or manage a program that attempts to optimize or maximize retirement and/or investment resources.

It is another feature and advantage of the present invention to implement a program designed specifically for managing and/or administering retirement and/or investment resources.

It is another feature and advantage of the present invention to ensure that the retirement and/or investment resources are not prematurely diverted, thereby compromising or jeopardizing the administration of retirement and/or investment resources.

It is another feature and advantage of the present invention to track the performance of the retirement and/or investment resources, while also managing reports on the performance of the retirement and/or investment resources, in a distributed data base environment.

It is another feature and advantage of the present invention to track the performance of resources, while also manage reports on the performance of the resources, in a distributed computing environment, such as over the internet and/or intranet and/or private networks.

The present invention is based, in part, on my discovery that an efficient and uncomplicated administration system may be constructed or produced that effectively manages, administers and/or generates reports for retirement and/or investment resources. I have further discovered that an efficient and uncomplicated administration system may be produced that effectively manages or administers investment resources to maximize same.

I have further discovered that an efficient and uncomplicated administration system may be provided that effectively manages or administers investment resources and prevents such resources from being prematurely diverted. Thus, the administration system provides superior, exceptional or optimal usage of the resources, providing unexpected benefits to the program beneficiary or recipient. The administration system also provides unexpected performance to the program administrator. In order to accomplish the above, I have discovered that unexpected benefits may be achieved when combining the feature, structure and/or procedural framework of an annuity with the feature, structure and/or procedural framework of a trust.

That is, I have discovered that a combination trust and annuity will permit the resources in the annuity to be tax deferred and maintained until the beneficiary is at a suitable age or condition for distribution, for example, retirement, disability and the like. As is described below in detail, tax deferred resources grow much more quickly than non-tax deferred resources. However, I have realized that when investment accounts are provided for beneficiaries, beneficiaries will generally terminate prematurely, or request distributions that compromise the effectiveness of the retirement resources for the beneficiary. In order to prevent early or undesirable distributions, I have determined that a trustee may be charged to administer the trust on the request of the customer, using the computer system to administer same. Accordingly, the trustee prevents undesirable withdrawal of resources so that the resources may grow tax-deferred for a substantial length of time.

In accordance with the computer administered and/or assisted program, $5,000, for example, may be invested for a new born beneficiary in the computer administered program. The beneficiary may be restricted from receiving distributions, for example, until retirement age of 65. The future value of $5,000 65 years later, if the proceeds are allowed to be reinvented on a tax deferred basis, is an incredible $5–8 Million dollars! This is an incredible amount of resources that may then be withdrawn from for the beneficiary's retirement. Accordingly, the computer administered or assisted program provides unexpected benefits to the beneficiaries thereunder.

To achieve these and other objects, the present invention provides a computer program product that stores computer instructions thereon for instructing a computer to perform a process of administering or assisting in the administration of resources of a customer for the benefit of a beneficiary. The program product includes a recording medium readable by the computer, and computer instructions stored thereon instructing the computer to perform the process. The instructions and the process include receiving a request from the customer to administer the resources in accordance with predetermined criteria, and storing customer related data associated with the customer. The instructions and process also include determining a predetermined period of time based on an age of the beneficiary at which withdrawals do not incur a tax penalty, and administering the resources in an annuity investment growing tax deferred in accordance with withdrawal criteria, and preventing withdrawal of the resources responsive to the withdrawal criteria.

In accordance with another embodiment of the invention, a computer program product stores computer instructions thereon for instructing a computer to perform a process of administering or assisting in the administration of resources of a customer for the benefit of a beneficiary. The program product includes a recording medium readable by the computer, and computer instructions stored thereon instructing the computer to perform the process. The instructions and the process includes receiving, by the user, a request from the customer to administer the resources in accordance with predetermined criteria, and storing, by the computer, customer related data associated with the customer. The instructions and the process also includes receiving or acknowledging, by the user with the assistance of the computer, receipt of the resources from the customer, entering the resources into the computer for administration, and appointing, by the user or the administrator, a trustee to administer and manage the resources. The instructions and the process also includes determining, by the user or the computer, a predetermined period of time based on an age of the beneficiary at which withdrawals do not incur a tax penalty, and administering, by the trustee with the assistance of the computer, the resources in an annuity investment growing tax deferred for the predetermined period of time or until occurrence of a predetermined event. The predetermined event enables withdrawals without incurring tax penalty. The instructions and the process also includes tracking performance of the resources, and transmitting, by the trustee or administrator with the assistance of the computer, details of the administration of the resources to at least one of the beneficiary and the customer. The instructions and the process also includes requesting, by the beneficiary, to the trustee or administrator to withdraw the resources, and determining, by the trustee or the administrator with the assistance of the computer, whether an initial period of time has expired. The instructions and the process also includes rejecting, by the administrator or the trustee with the assistance of the computer, the request of the beneficiary when the initial period of time has expired and when the predetermined period of time has not expired and when the predetermined event has not occurred. The instructions and the process also includes transmitting, by the administrator or the trustee with the assistance of the computer, the resources to the beneficiary when the initial period of time has not expired, and transmitting, by the administrator or the trustee with the assistance of the computer, the resources in accordance with the predetermined criteria to the beneficiary when the initial period of time has expired and when the predetermined period of time has expired or when the predetermined event has occurred.

A computer system and process is also provided.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

The above objects of the invention, together with other apparent objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 9 is an illustration that shows that deferral of taxes is still the winner even if tax rates rise over time;

The same reference numerals refer to the same parts through the various figures.

NOTATIONS AND NOMENCLATURE

Figure 2:
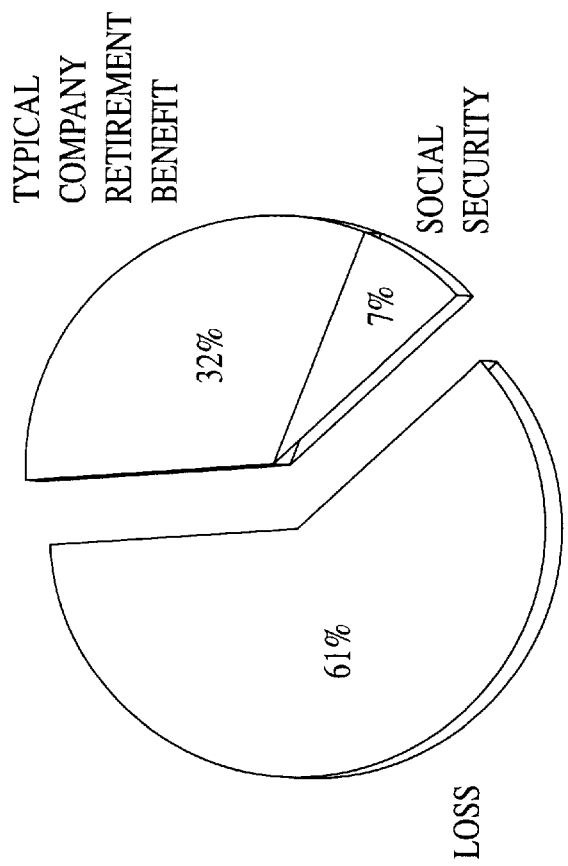
FIG. 2 is an illustration of a typical retirement benefit when the final pay is $150,000.
Figure 1:
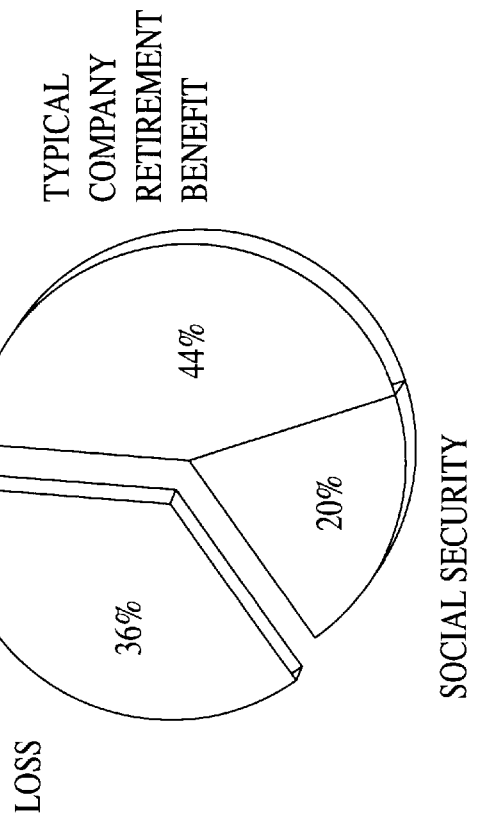
FIG. 1 is an illustration of a typical retirement benefit when the final pay is $50,000.
Figure 3:
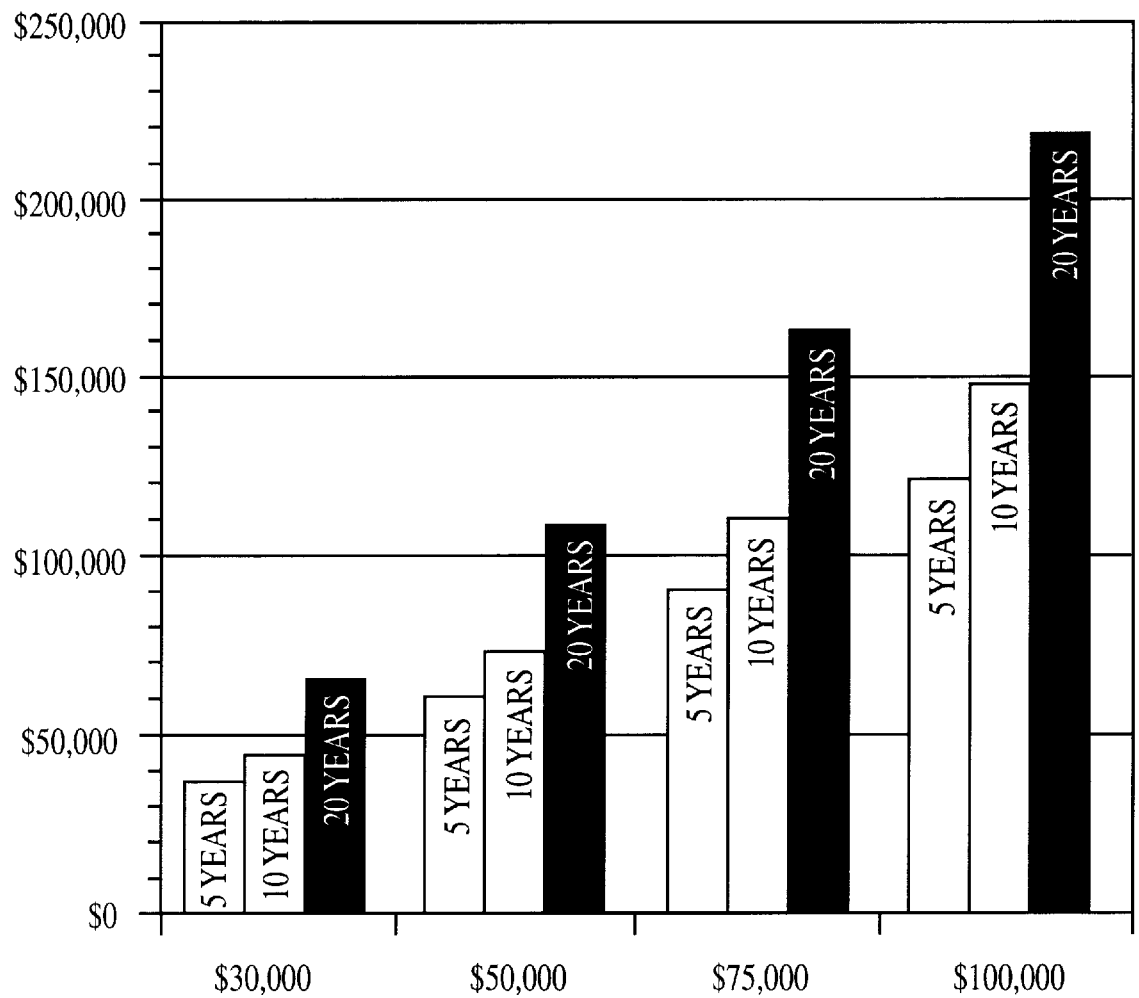
FIG. 3 is an illustration of earning growth based on 4% annual pay increases.
Figure 4:
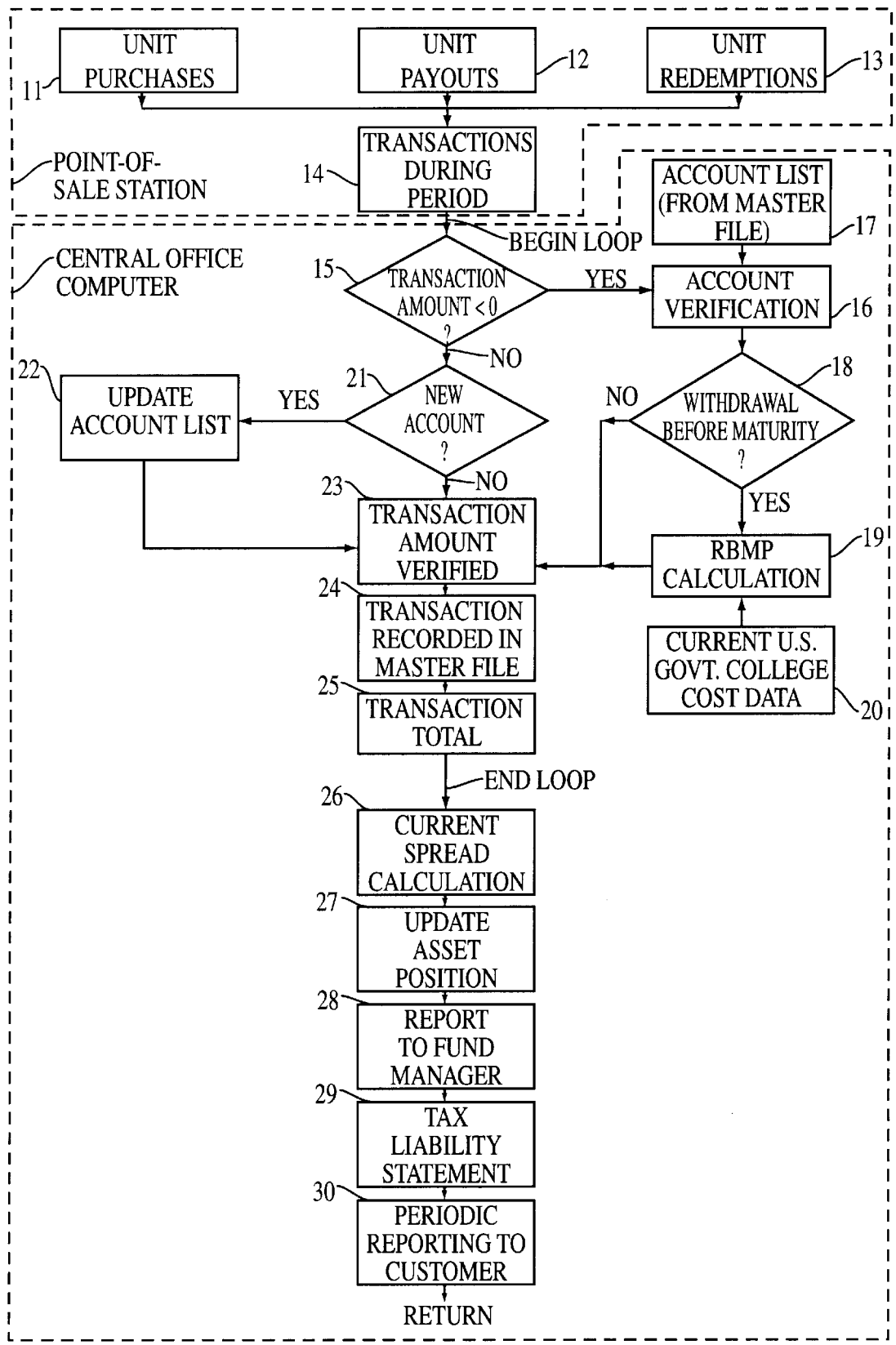
FIG. 4 is a flowchart of a prior art computer process for funding a future liability.
Figure 5:
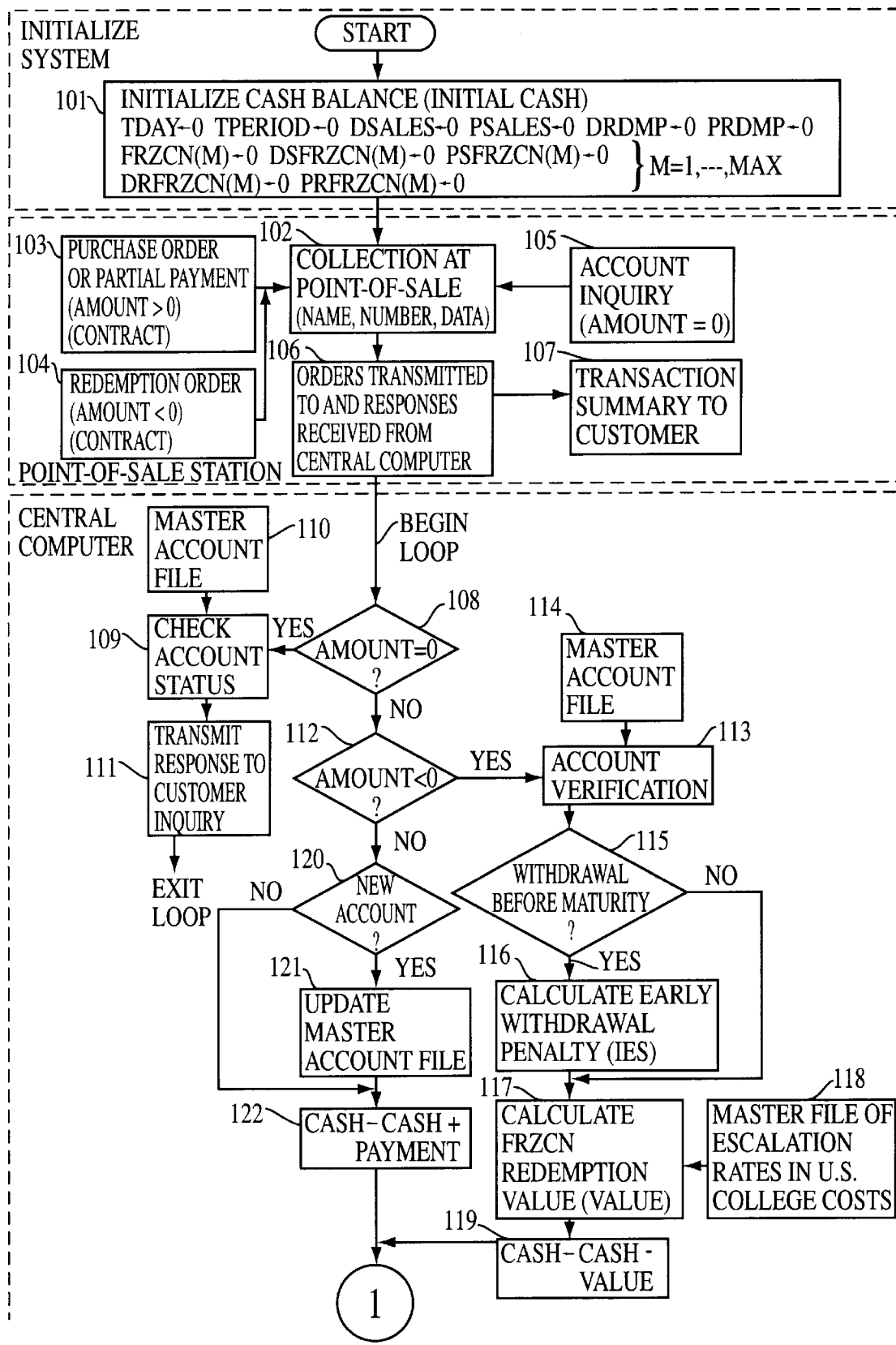
FIGS. 5–7 are flowcharts illustrating the computer process for funding a future liability using a floating rate zero coupon note.
Figure 6:
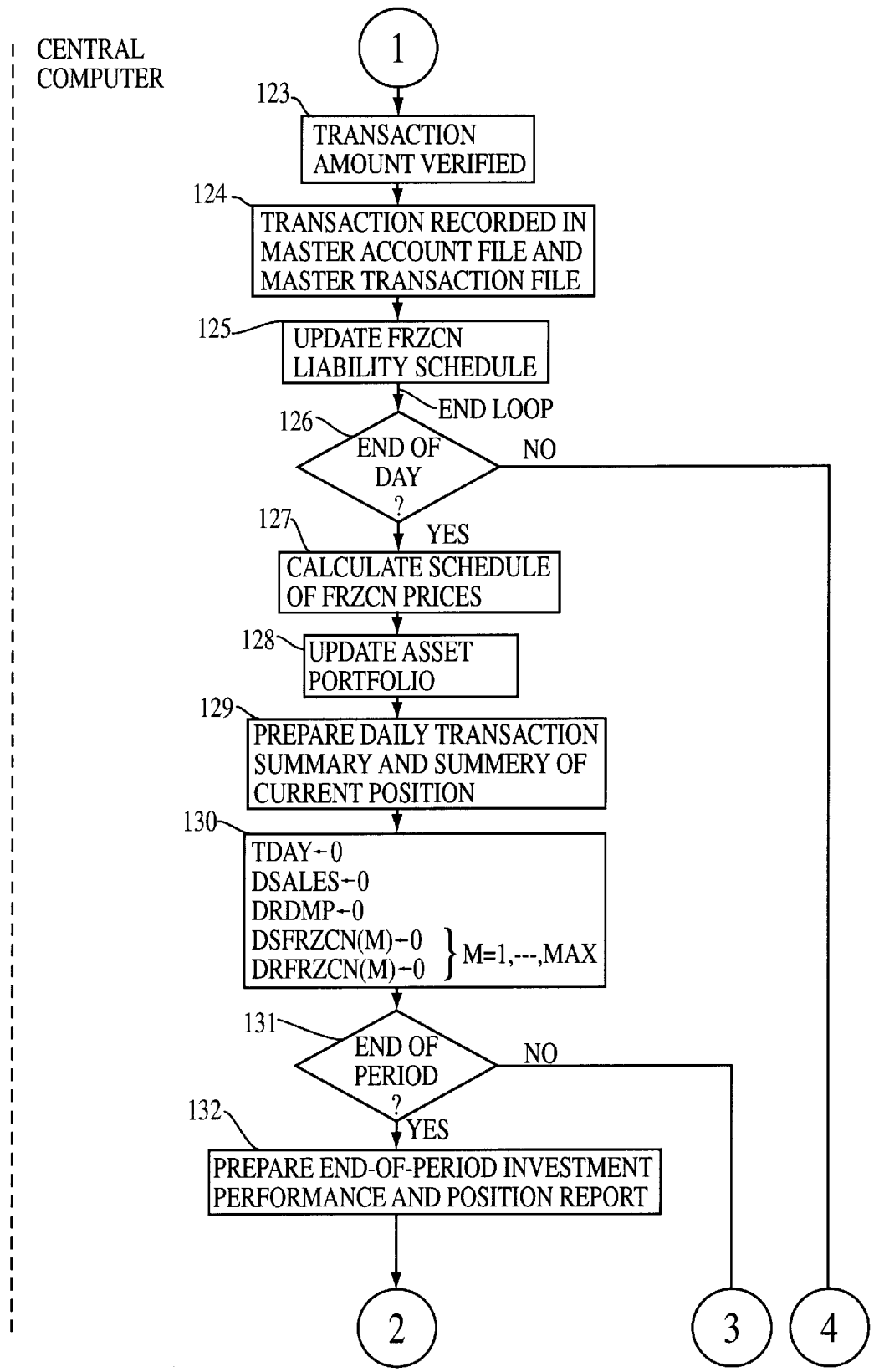
Figure 7:
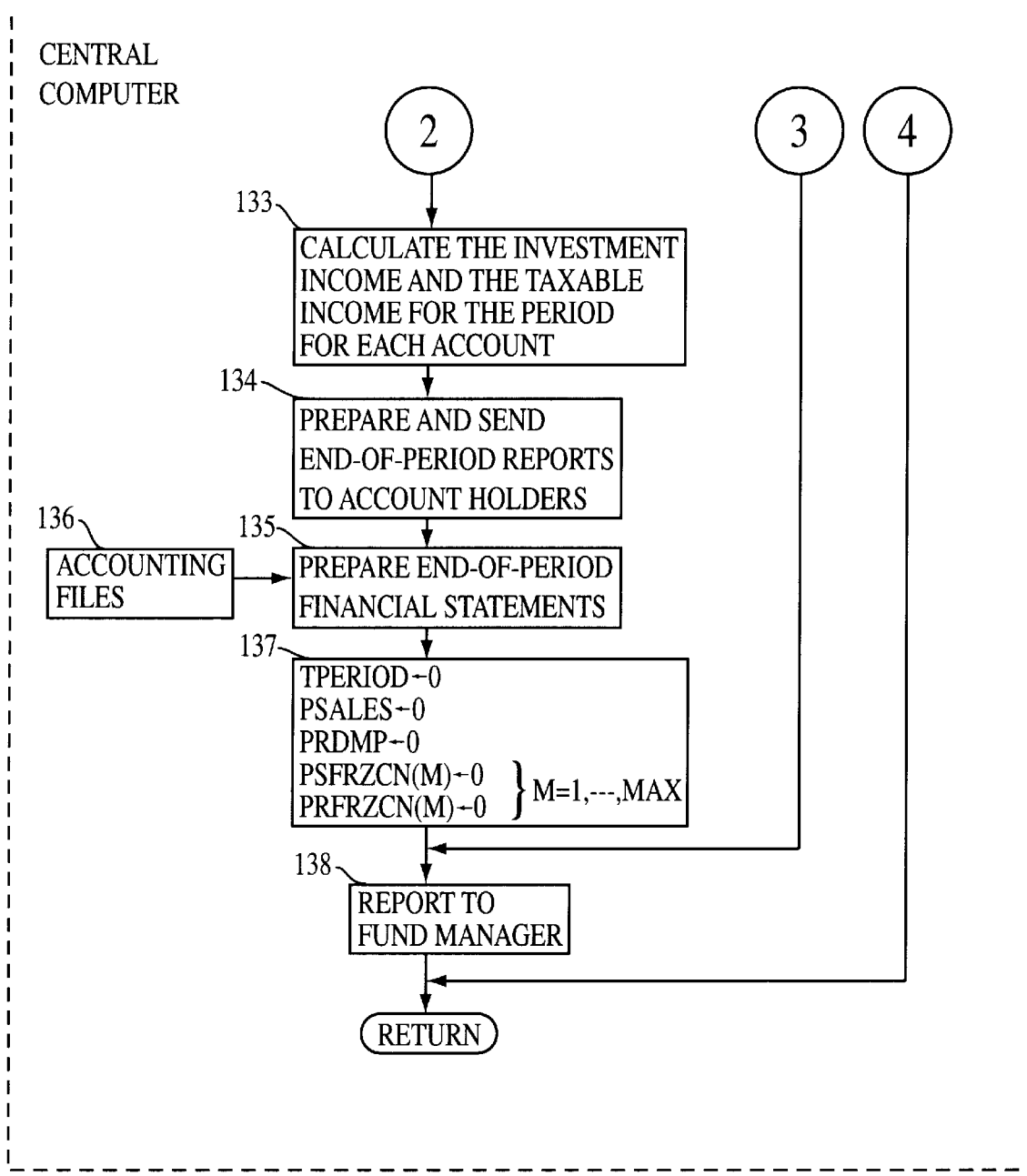

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF BEST MODE FOR CARRYING OUT THE INVENTION

The computer assisted and/or implemented process and architecture of the present invention administers an investment and/or retirement program. The goal of the program is to maximize the investment and investment performance, and to minimize government obligations (e.g., taxes) associated therewith. The program is designed specifically for managing and/or administering retirement and/or investment resources. The program also ensures that the retirement and/or investment resources are not prematurely diverted. The reason why it is so important that investment resources not be diverted is that is compromises or jeopardizes the likelihood of maximizing the investment and investment resources, as is discussed below in greater detail.

The computer assisted and/or implemented process and architecture tracks the performance of the retirement and/or investment resources, while also managing reports on the performance of the retirement and/or investment resources, in a distributed data base environment. The distributed data base environment may be, for example, over the internet, intranet and/or other private networks. The distributed data base environment may also be, for example, over hard wired lines, modem connections, and the like.

The computer assisted and/or implemented process, computer architecture and program (i.e., software and investment) provides an efficient and uncomplicated administration system that effectively manages, administers and/or generates reports for retirement and/or investment resources. The computer assisted and/or implemented process and architecture also effectively manages or administers investment resources to maximize same.

In order to accomplish the above, the computer assisted and/or implemented process, architecture and program effectively prevents such resources from being prematurely diverted. Thus, the administration system provides superior, exceptional or optimal usage of the resources, thereby providing unexpected benefits to the program beneficiary or recipient. The administration system also provides unexpected performance to the program administrator.

The computer assisted and/or implemented process, architecture and program provides unexpected benefits when administering and combining the feature, structure and/or procedural framework of an annuity with the feature, structure and/or procedural framework of a trust. Each of these devices or mechanisms are discussed below in greater detail.

Annuities are generally of the form of variable annuities or fixed annuities. A variable annuity works as follows: Instead of opening a mutual fund account, you turn to an insurance company, which sponsors variable annuities. Each annuity offers "subaccounts" managed by a mutual fund family. These subaccounts closely mimic the fund family's mutual funds, and you can choose the ones you want.

Variable annuities derive their name from the fact that the return you earn varies with the performance of the subaccounts you choose. If you choose the stock subaccount, your account will rise and fall with the stock market; if you invest in the bond subaccount, your account will reflect the performance of the bond market.

Figure 8:
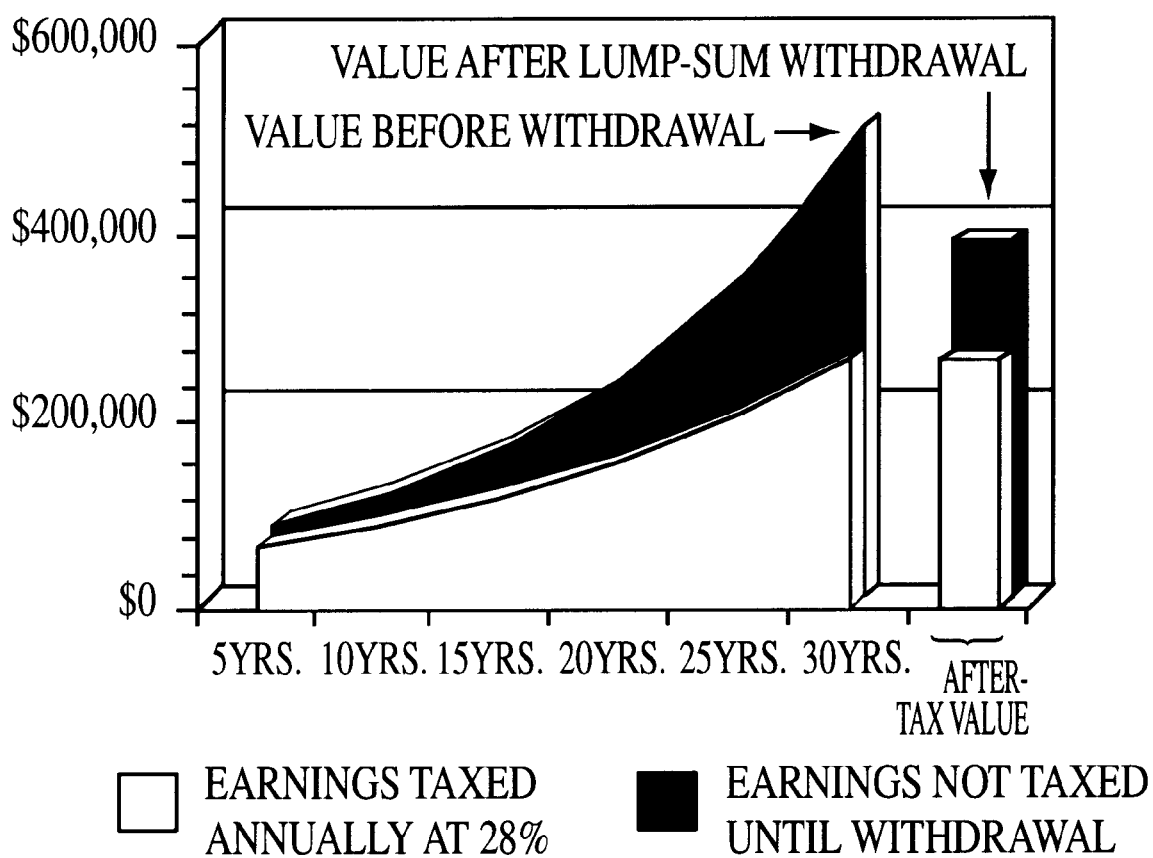
FIG. 8 is an illustration of the growth process of money, illustrating money that grows tax-deferred grows more quickly than money that is taxed annually.
Figure 10:
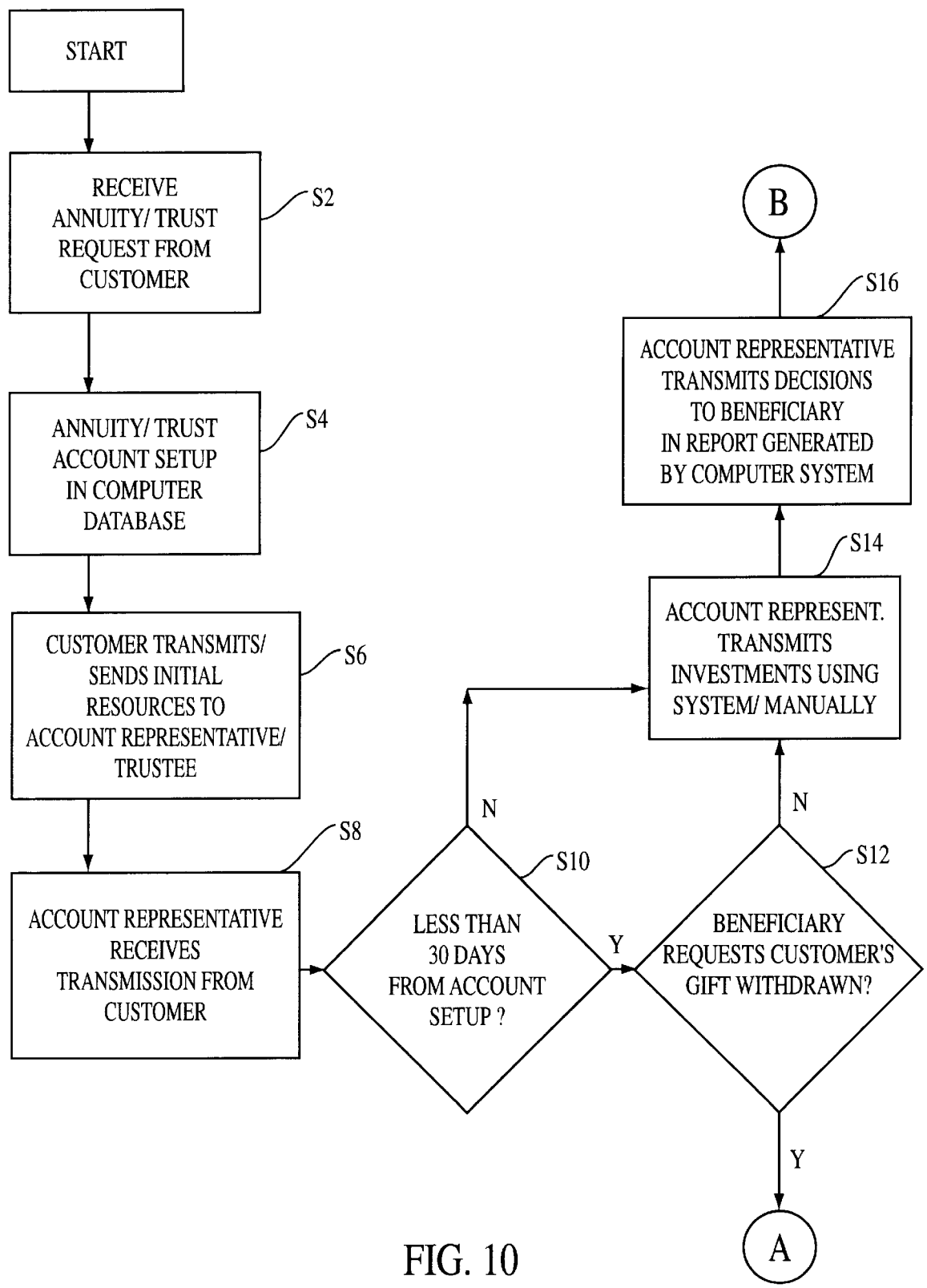
FIGS. 10–13 are flowcharts of the computer assisted-implemented process for managing and/or administering the retirement and/or investment resources.
Figure 11:
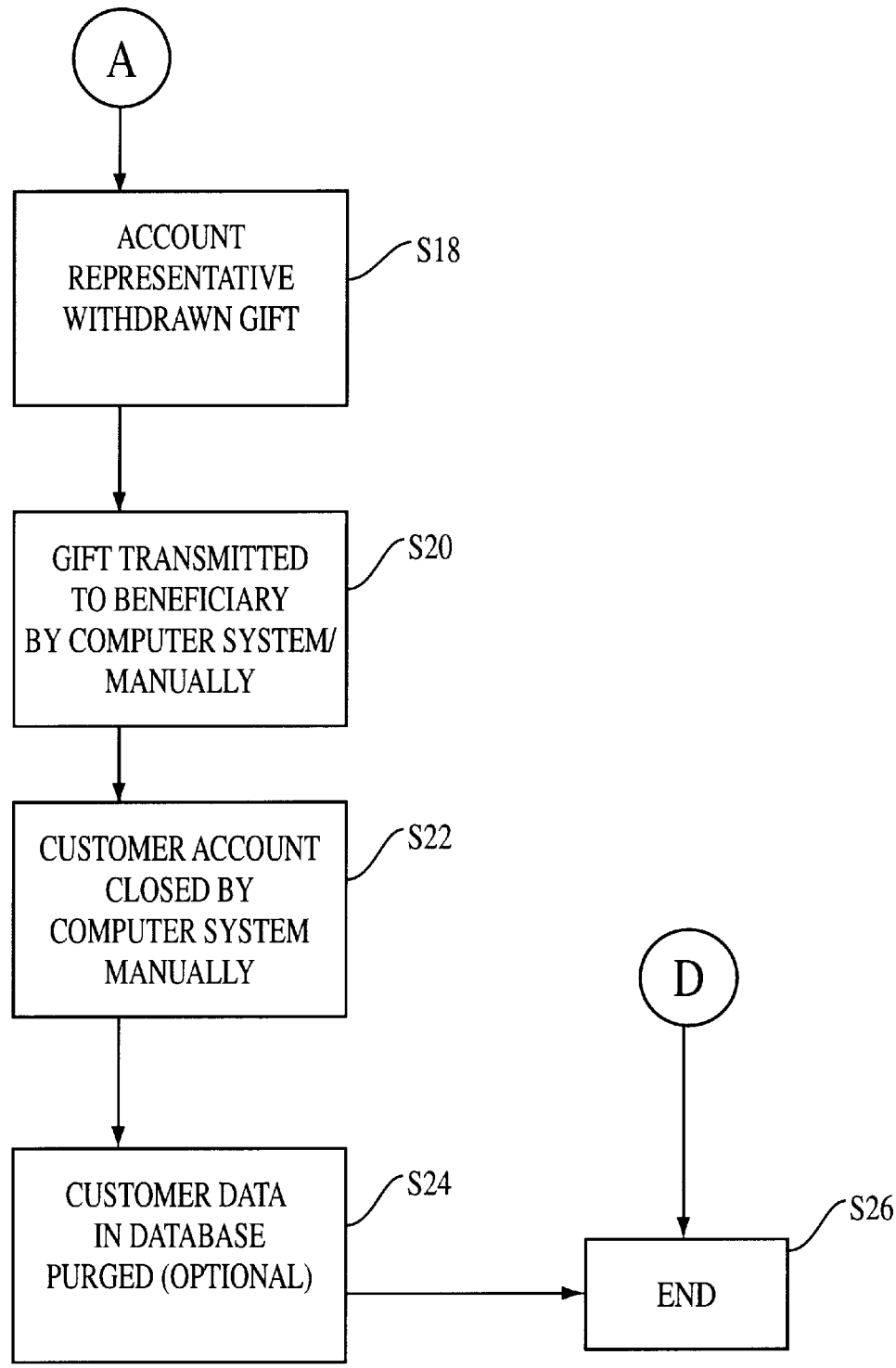
Figure 12:
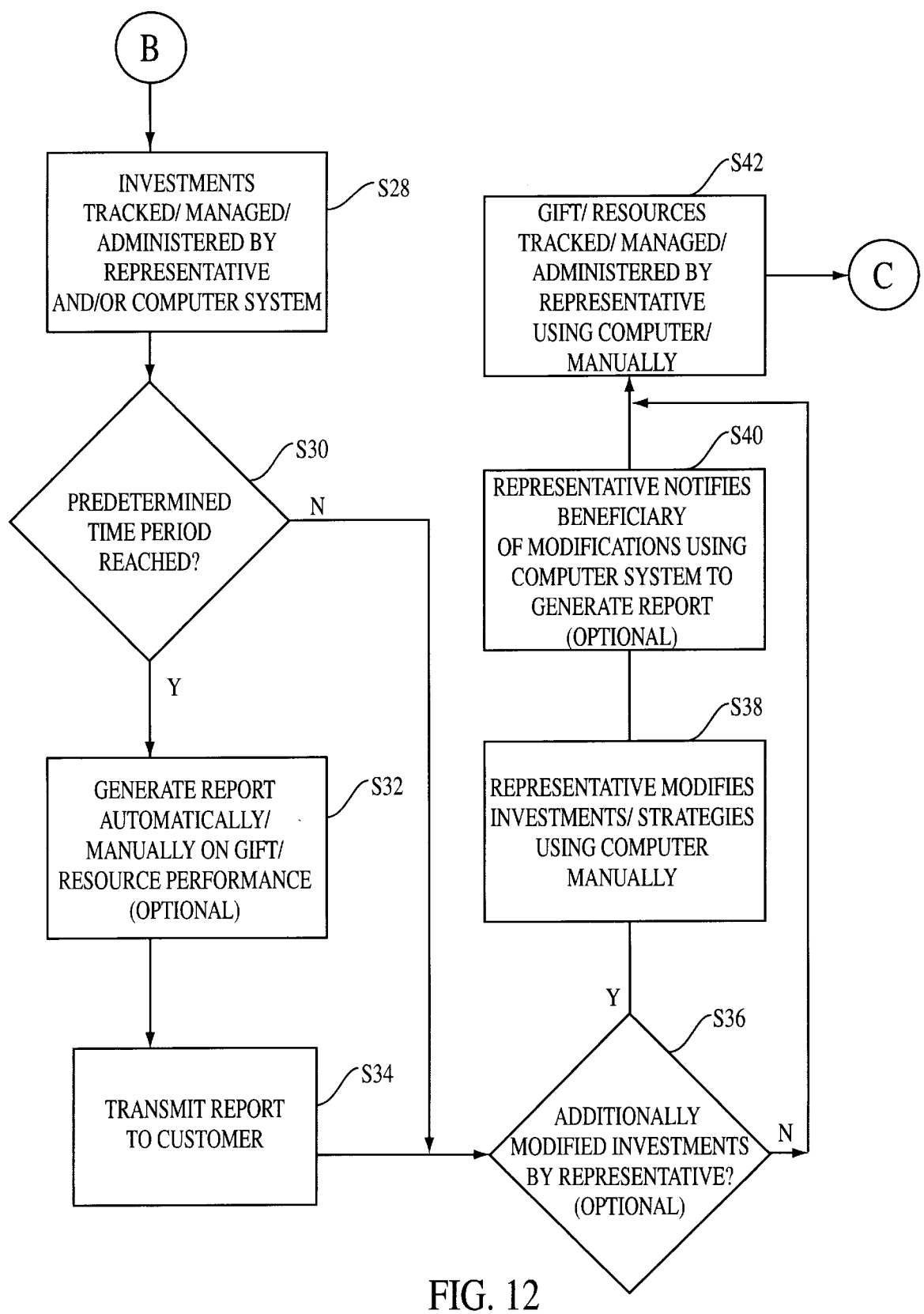
Figure 13:
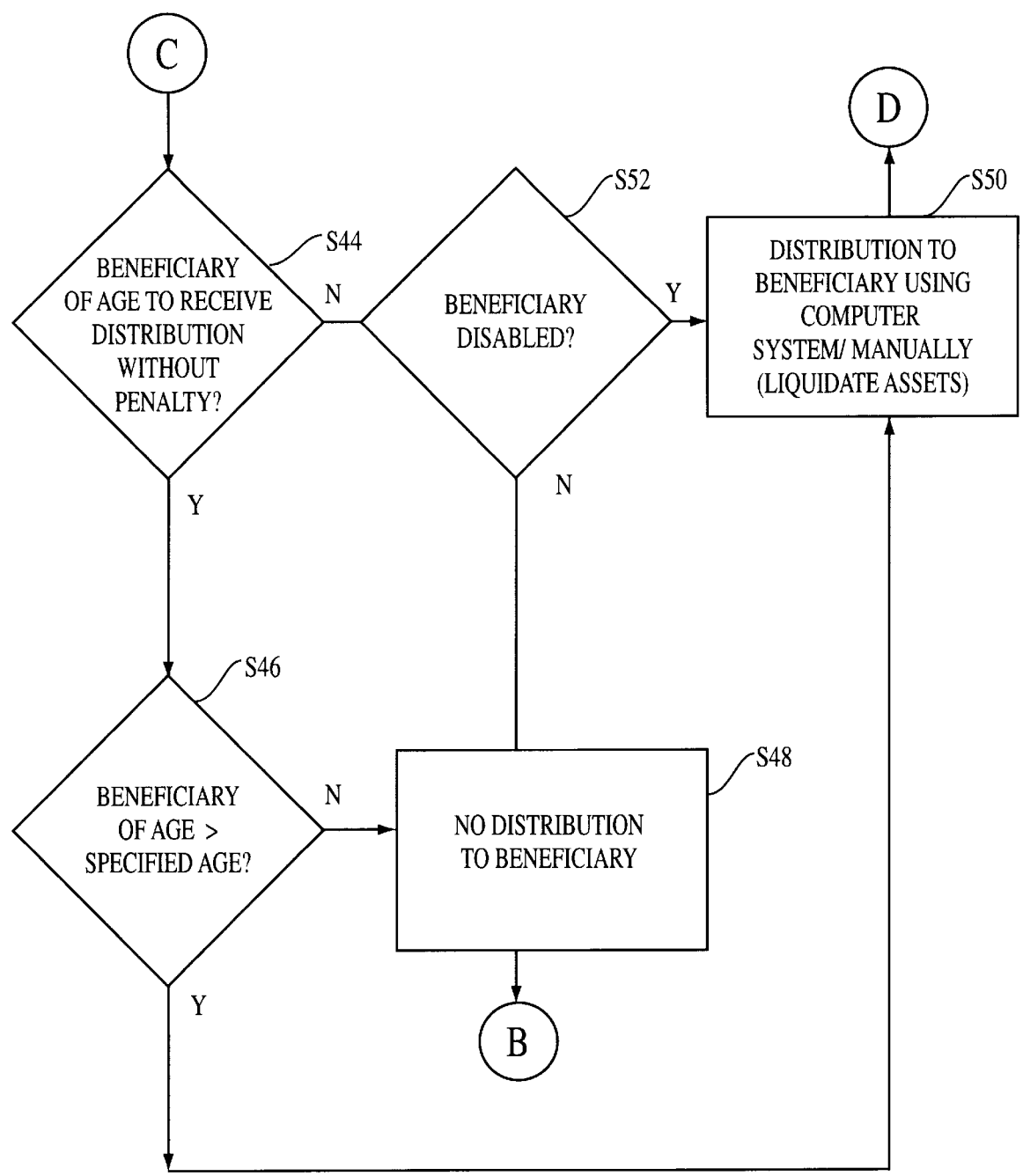

Because under current tax law, money placed in an insurance contract grows tax-deferred, meaning you do not pay taxes on your earnings until you withdraw your money. And money that grows tax-deferred grows more quickly than money that is taxed annually, as FIG. 8 demonstrates. As illustrated in FIG. 8, after paying the taxes that have been deferred, the after-tax profit is $326,256, meaning that the increase in profit is 653%. This remains a solid improvement over non-tax deferral investment vehicles or devices.

Many investors question the viability of tax-deferred strategies, given today's relatively low tax rates. Besides (knowing Congress), rates could well rise over time. Therefore, why defer paying taxes when future tax rates will be higher—the answer is this: even if tax rates rise, tax-deferral remains a winner. FIG. 9 is an illustration that shows that deferral of taxes is still the winner even if tax rates rise over time. In FIG. 9, it is assumed that the $100,000 is invested at 10% annual interest for 10 years. This example assumes that tax rates will rise during this period, from 30% to 50%.

In this example, the taxable account pays taxes annually while the tax-deferred account defers taxes. If you completely liquidate both accounts in the 10th year, the net value of the taxable account (which paid taxes at ever-increasing rates each year) would be $174,026, while the tax-deferred investment (which paid no taxes during the 10 years but then paid all its taxes at the top rate of 50%) has a net after-tax value of $179,687—$5,661 more than the taxable account. Thus, the tax-deferred annuity comes out (slightly) ahead.

But this assumes you liquidate in the 10th year—and that is highly unlikely. More likely: you will want to receive income from the investment on a regular basis. Assuming you withdraw 10% per year from the current balance, you'll receive from the taxable account (after paying taxes) $8,701, but the tax-deferred investment will give you $12,698—a 49% increase in after-tax income compared to the taxable account!

Thus, no matter how you calculate it, tax deferral makes a lot of sense, and the power of tax-deferred annuities cannot be ignored.

If tax-deferral is not enough of a feature for a variable annuity, annuities also provide security for your investment. How would you like to invest knowing your account can only rise, never fall. Here's how this feature of the variable annuity it works.

Say you place $100,000 into a variable annuity, choosing the annuity's stock subaccount. Let's further say your timing is not exactly wonderful. The day after you invest, a major stock market crash cuts the value of your account to $75,000. If you withdraw the $75,000, you would lose $25,000. Instead, you should withdraw $74,000, leaving $1,000 in the account. The reason is that the annuity guarantees to give you:

what you invested minus withdrawals, or the current value, whichever is greater.

Thus, your investment ($100,000) minus withdrawals ($74,000) is $26,000, and the current value of the annuity is $1,000. Therefore, the insurance carrier owes your beneficiary the greater of the two, or $26,000.

Variable annuities also periodically reset the minimum value of your investment for purposes of calculating the above. In other words, every five or seven years or so, the annuity carrier will set the current value as the new minimum below which you cannot fall. Thus, if you invest $100,000 and it later grows to $150,000, the latter amount becomes the basis for the minimum guarantee. If the account later falls to $125,000, the contract guarantees you the $150,000 value.

How do you benefit from this can't-lose guarantee? It's easy, all you have to do is die. Remember, the guarantee is from an insurance company. So, although this guarantee is excellent, it comes with a fairly significant piece of fine print. Thus, most folks should not be impressed with this no-loss guarantee, but for others it is worthwhile. For example, elderly retirees with lots of money in CDs are not spending all their money and they know they never will. Rather, they intend to leave their money to their grandchildren for college.

Because they want nothing to happen to their money, the grandparents put everything into certificates of deposit (CDs) with fixed and guaranteed interest rates. They should consider an annuity stock subaccount instead. Because of the no-loss guarantee, the worst thing that could happen is that the account will be worth at their death exactly what it is worth today, even if the stock market crashes in the meantime. But assuming stocks perform as well in the future as they have in the past, the account should be worth substantially more than if they invest the money in CDs.

Some people don not like the variableness of annuities. They want the security of a fixed rate of return, like they get from CDs. To meet this demand, insurers offer fixed annuities. Even though variable annuities are advantageous, fixed annuities are not. Under the law, fixed annuities are considered insurance products and are sold by insurance agents.

Variable annuities, on the other hand, are considered securities products and those who offer them must possess both a federal securities license and a state variable life license. This subtlety generally makes all the difference.

Under insurance law, money you give to an insurance company is commingled with the general assets of that company. Thus, if the carrier goes broke, your money is lost with it. But because variable annuities fall under federal securities rules, money you invest in a variable annuity is segregated from the assets of the insurance carrier. Thus, if the carrier goes broke, your money is lost with it. But because variable annuities fall under federal securities rules, money you invest in a variable annuity is segregated from the assets of the insurance carrier. Thus, even if the insurance company goes broke, your money remains safe.

In exchange for not taxing you each year, any withdrawals you make prior to age 50½ are subject to a 10% IRS penalty. Thus, annuities are intended as long-term investments. This applies to both fixed and variable annuities. In addition, variable annuities also incur the following expenses:

- an annual contract fee which ranges typically from $30 to $75 per year, depending on the size of your account;
- the annual expense ratio of the subaccount; since variable annuities are managed by mutual fund families, you'll incur their annual costs as well; and
- an annual mortality charge of 1% to 2% per year to compensate the insurer for the death benefit guarantee it provides.

Because of the additional costs, many assume they will earn more in mutual funds than in annuities. But consider the following:

- you must pay taxes annually on the profits you earn in a mutual fund, but you do not with the annuity. This tax-deferral can more than compensate for the additional cost, as long as you keep the variable annuity for five years or more;
- you can lose money in the mutual fund, but the annuity offers a minimum guarantee. Thus, you receive a benefit in exchange for the additional cost; and
- perhaps most importantly, the assumption itself has not always proven valid. In 1991, for example, Lipper Analytical Services reported that, net of all costs, the average stock mutual fund gained 35.21%, while the average variable annuity stock subaccount gained 36.25%. Thus, the annuity average actually beat the fund average by 1.04%, defying expectations of reduced performance.

There are two tax traps with annuities that you must beware:

(1) If you liquidate an annuity or receive income from it, the proceeds are taxed at ordinary income tax rates, as opposed to the potentially more favorable capital gains tax rate.

(2) Annuities do not enjoy a stepped-up basis at death. This means your children could incur significant tax liabilities—equal, in fact, to the tax savings you enjoyed during your lifetime.

The bottom line is that the tax break provided by annuities is deferral, not exemption. Someone (eventually) will pay taxes on the profits you earn in your annuity—if not you, then your heirs.

A trust, on the other hand, is a mechanism that allows one to impose some controls over a corpus or resources that one intends to give to an intended beneficiary. That is, a trust is a fiduciary relationship in which one person is the holder of the title to property subject to an equitable obligation to keep or use the property for the benefit of another.

The settlor (i.e., customer as described herein) of a trust is the person who intentionally causes the trust to come into existence. The trustee (i.e., administering institution, or institution affiliated with or working with the administering institution) is the person who holds title for the benefit of another. The trust property is the property interest which the trustee holds subject to the rights of another. The beneficiary is the person for whose benefit the trust property is to be held or used by the trustee. The trust instrument is the document by which property interests are vested in the trustee and beneficiary and the rights and duties of the parties (called the trust terms) are set forth.

In the management of the trust the trustee is bound to display the skill and prudence which an ordinarily capable and careful man would use in the conduct of his own business of a like character and with objective similar to those of the trust. The trustee owes a duty to the beneficiaries to administer the affairs of the trust solely in the interests of the beneficiaries, and to exclude from consideration his own advantages and the welfare of third persons. This is called the duty of loyalty.

If the trustee engages in a disloyal transaction, the beneficiary may secure the aid of equity in avoiding the act of the trustee or obtaining other appropriate relief, regardless of the good faith of the trustee or the effect of the trustee's conduct on the beneficiary or benefit to the trustee. If a trustee enters into a transaction with a beneficiary relating to the interest of the beneficiary under the trust, the trustee owes the beneficiary a duty to display the utmost fairness.

This duty of utmost fairness ordinarily involves disclosure to the beneficiary of all relevant facts which are unknown to the beneficiary, a statement as to the legal rights of the beneficiary and the effect of the proposed dealing, and the payment of adequate consideration if no gift was involved. In addition there may be a duty to advise the beneficiary to secure independent counsel as to the wisdom of the transaction or to secure such advice for him.

On taking office a trustee has a duty to examine the investments delivered to him as the original trust assets and to decide whether they are proper for retention under the terms of the trust instrument and the applicable statute or common law. He cannot assume that the investments are legal. During the course of his administration the trustee has a duty to review and reexamine the investments of his trust at reasonable intervals in order to determine whether they are proper for retention or should be sold.

When, at the beginning of the trust, or thereafter, an investment becomes one not permitted under the terms of the trust or the law of the state in question, the trustee has a duty to sell it as soon as he reasonably can and to reinvest the proceeds. A trustee must follow the trust instrument as to the time, amount, form and destination of payments which he is directed or authorized to make from income or principal to the beneficiaries. A trustee's duties are usually absolute, and that he is not excused from performing them correctly even though he may have used reasonable care and prudence.

In order that he may be able to present to the court and the beneficiaries an accurate history of his administration, the trustee is under a duty to retain trust documents, to secure and file vouchers for expenditures, and to keep records. The trustee is under a duty to furnish to the beneficiary on demand all information regarding the trust and its execution which may be useful to the beneficiary in protecting his rights, and to give to the beneficiary facts which the trustee knows or ought to know would be important to the beneficiary.

I have discovered that unexpected benefits are achieved when the annuity is controlled under a trust for the benefit of an intended beneficiary, when specific conditions apply to the administration of the trust, and when the trust is administered with the assistance of a computer system described herein. That is, I have discovered that a combination trust and annuity will permit the resources in the annuity to be tax deferred and maintained until the beneficiary is at a suitable age or condition for distribution, for example, retirement, disability and the like.

For example, as illustrated in FIG. 8, tax deferred resources grow much more quickly than non-tax deferred resources. However, I have realized that when investment accounts are provided for beneficiaries, beneficiaries will generally terminate prematurely, or request distributions that compromise the effectiveness of the retirement resources for the beneficiary. In order to prevent early or undesirable distributions, I have determined that a trustee may be charged to administer the trust on the request of the customer, using the computer system to administer same. Accordingly, the trustee prevents undesirable withdrawal of resources so that the resources may grow tax-deferred for a substantial length of time.

In accordance with the computer administered program, $5,000, for example, may be invested for a new born beneficiary in the computer administered program. The beneficiary may be restricted from receiving distributions, for example, until retirement age of 65. The future value of $5,000 65 years later, if the proceeds are allowed to be reinvented on a tax deferred basis, is an incredible $5–8 Million dollars! This is an incredible amount of resources that may then be withdrawn from for the beneficiary's retirement. Accordingly, the computer administered or assisted program provides unexpected benefits to the beneficiaries thereunder.

FIGS. 10–13 are flowcharts of the computer assisted-implemented process for managing and/or administering the retirement and/or investment resources. If FIGS. 10–13, the representative and/or trustee for the institution that is administering and/or managing the resources receives an annuity/trust request from the customer in Step S2, and sets up an initial account for the annuity/trust request in the computer database in Step S4. In Step S6, the customer transmits/sends initial resources to the account representative/trustee for managing and/or administering, as well as any other fees that may be required for the use of services.

The account representative receives the transmission from the customer in Step S8. The beneficiary generally has the ability to withdraw the resources from the institution managing and/or administering same for a predetermined period of time, e.g., 30 days. If, for example, the computer system determines that there is less than 30 days from when the account was set up in Step S10, and the beneficiary requests the customer's gift not be withdrawn in Step S12, or if it is more than 30 days from when the account has been set up in Step S10, the account representative transmits the investments using the computer system, or alternatively manually, in Step S14. In addition, the account representative transmits the investment decisions of the resources to the beneficiary and a report is generated by, for example, the computer system in Step S16.

When the beneficiary requests that the customer's gift be withdrawn in Step S12, and when it has been less than 30 days from when the account has been set up, the account representative withdraws the gift in Step S18, and transmits the gift to the beneficiary using, for example, the computer system, or alternatively manually, in Step S20. The customer account may then be closed by, for example, the computer system or manually in Step S22. The customer data in the database is optionally purged in Step S24, and the process for setting up, administering and managing the customer resources ends in Step S26.

Returning to Step S16, where the account representative transmits decisions to the beneficiary in a report, the account representative and/or system tracks, manages and administers the investments and/or resources in Step S28. In Step S30, it is determined whether a predetermined time period has been reached, and if so, a summary report is generated automatically or manually regarding the performance of the gift/resource in Step S32, and the report which is optionally generated, is transmitted to the customer in Step S34.

After the report has been transmitted to the customer in Step S34 or if a predetermined time period has not been reached in Step S30, as well as any time that the representative/trustee determines it is appropriate, the resource investments may be modified as appropriate in Step S36, and if so, the representative modifies the investments and/or strategies using the computer system or manually in Step S38. The representative optionally notifies the beneficiary of the modifications using the computer system to generate, or to assist, in the generation of the report in Step S40.

Thereafter, or if the representative determines that the resources are not to be modified, the system with the cooperation of the representative, tracks, manages and/or administers the gifts or resources using the computer and/or manually in Step S42. The computer system and/or representative determines whether the beneficiary is of age to receive the distribution or withdrawal without penalty in Step S44, and if so, then determines whether the beneficiary has achieved the predetermined age as specified by the customer in Step S46. When the beneficiary has reached the specified age in Step S46, then the beneficiary may be distributed the resources using the computer system or manually in Step S50, i.e., the beneficiary's resources are liquidated in Step S50. After the resources have been distributed to the beneficiary in Step S50 in accordance with predetermined criteria, the process then ends in Step S26.

If the beneficiary has not reached the age of distribution without a penalty in Step S44, then in Step S52, it is determined whether the beneficiary is disabled. If the beneficiary is disabled in Step S52, then the beneficiary may also be distributed the resources in accordance with predetermined criteria in Step S50. If, however, the beneficiary is not disabled in Step S52, or the beneficiary has not reached the specified age in Step S46, then there is no distribution to the beneficiary. After it is determined that no distribution to the beneficiary should be made in Step S48, control of the administration, tracking and/or management of the resources is then returned to Step S28.

As discussed above, the assets or resources may be distributed at a specific age, such as at an age where withdrawal of resources does not incur a tax penalty. In addition, or in the alternative, the resources may be distributed at the death of the customer, at the death of the beneficiary, and the like. Further, funds may be distributed to the beneficiary after the resources reach a predetermined level, or on the request of the customer, beneficiary, or trustee. In the alternative to distributing the resources after one or more of the above predetermined events have occurred to one or more of the above recipients, the resources may be reinvested and a new customer, beneficiary, trustee, and the like, may be designated.

In addition, the customer may also have the option of how much information is to be disclosed to the beneficiary, or the beneficiary may receive notices on a regular basis, as described in detail above. The customer may also have the ability to restrict the distribution, predesignate the form of the distribution, and the like. For example, the customer may designate the beneficiary receive a lump sum, distribution over a life expectancy, a combination of both, and the like.

Figure 14:
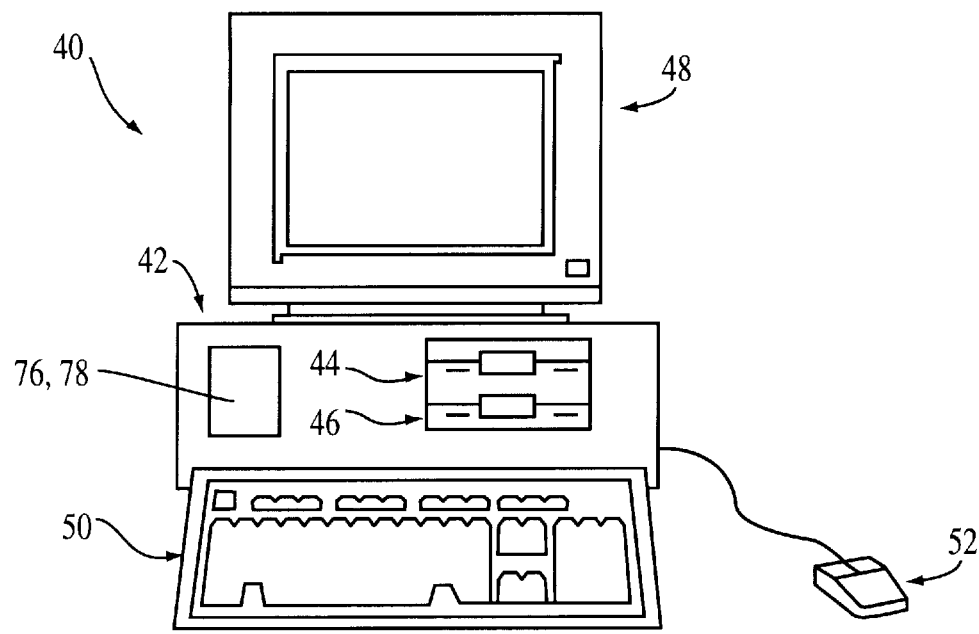
FIG. 14 is an illustration of a main central processing unit for implementing the computer processing in accordance with a computer implemented embodiment of the present invention.

FIG. 14 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 14, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 15:
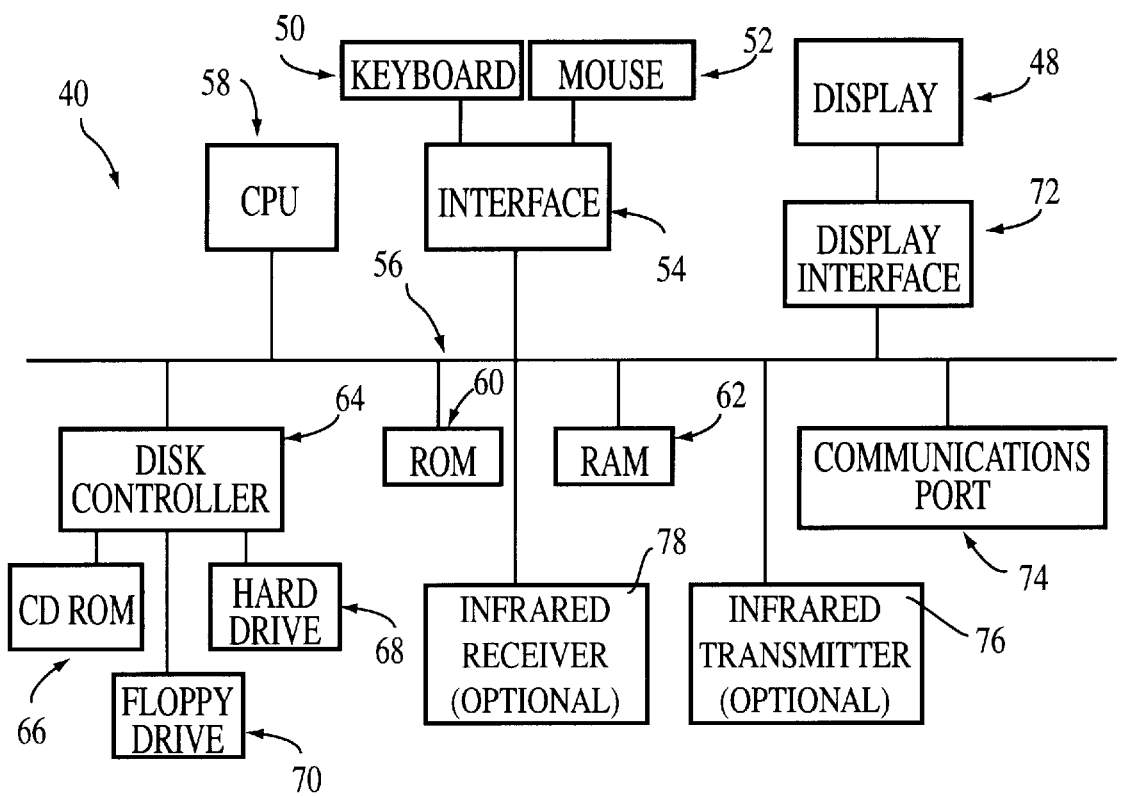
FIG. 15 illustrates a block diagram of the internal hardware of the computer of FIG. 14.

FIG. 15 illustrates a block diagram of the internal hardware of the computer of FIG. 14. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 16:
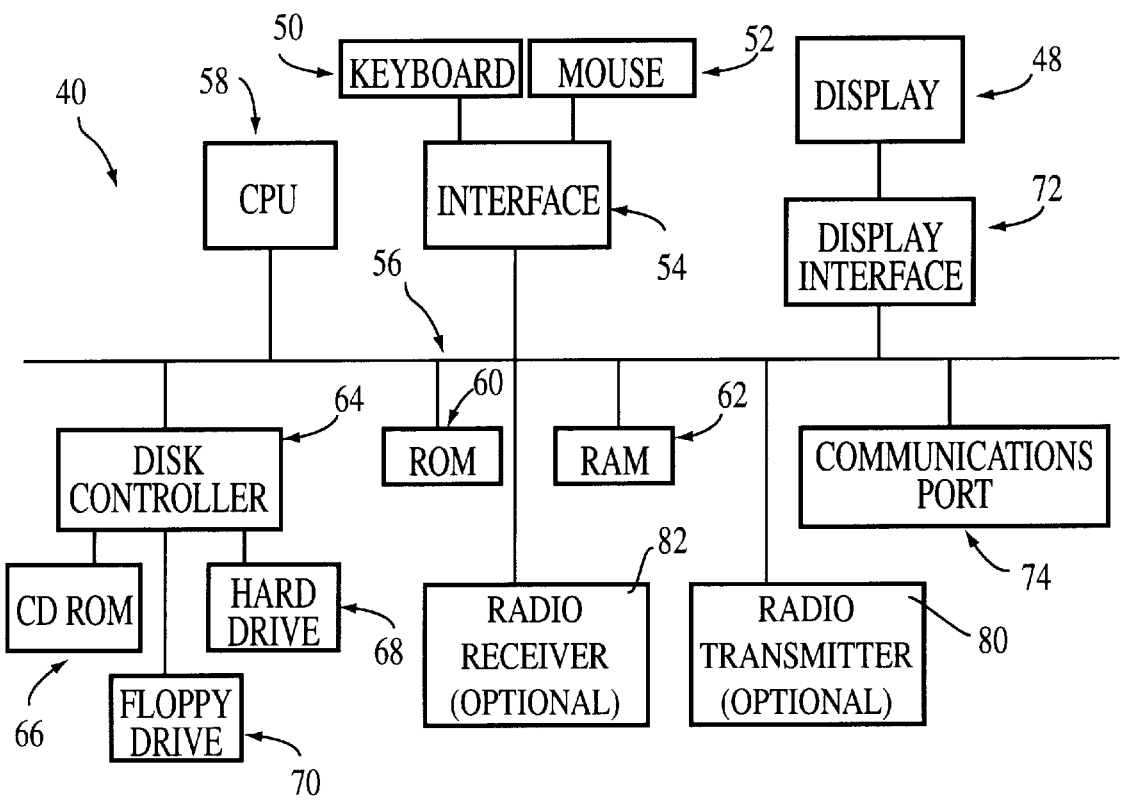
FIG. 16 is a block diagram of the internal hardware of the computer of FIG. 14 in accordance with a second embodiment.

FIG. 16 is a block diagram of the internal hardware of the computer of FIG. 14 in accordance with a second embodiment. In FIG. 16, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 17:
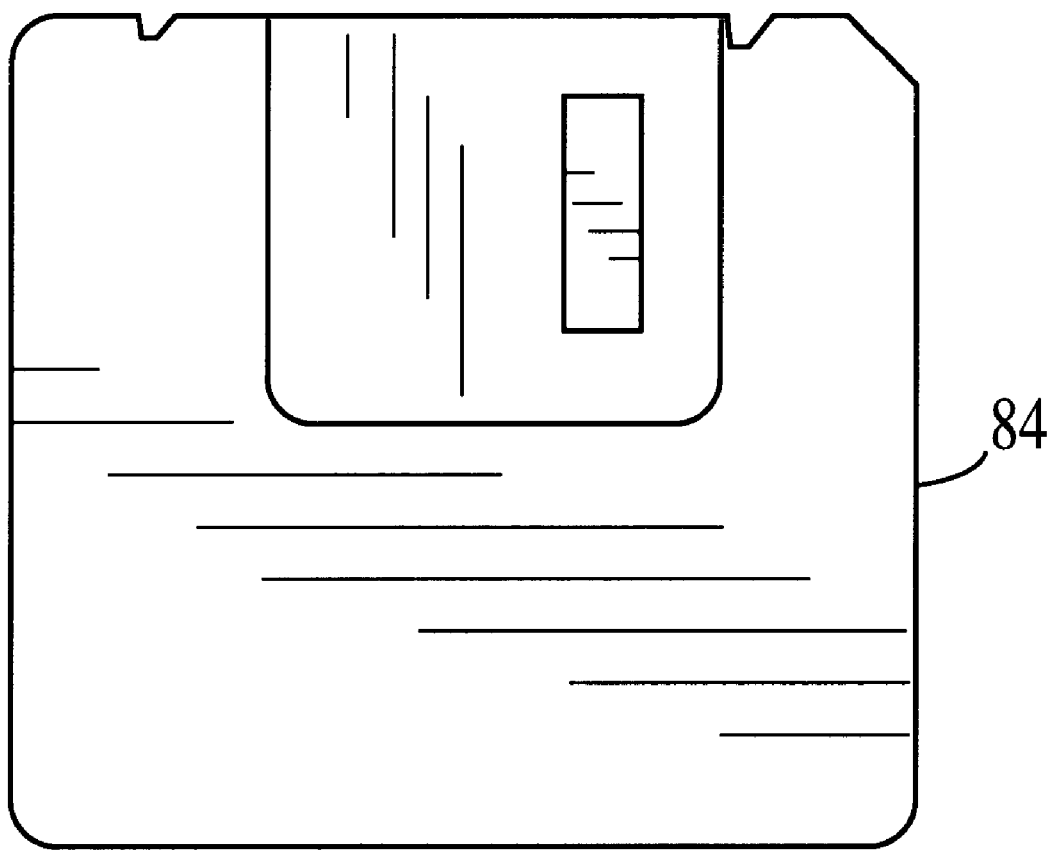
FIG. 17 is an illustration of an exemplary memory medium which can be used with disk drives illustrated in FIGS. 14–16.

FIG. 17 is an illustration of an exemplary memory medium which can be used with disk drives illustrated in FIGS. 14–16. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 15–16 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators,and hand-held, laptop/notebook, mini, mainframe and super computers, as well as processing system network combinations of the same.

Conventional processing system architecture is more fully discussed in *Computer Organization and Architecture*, by William Stallings, MacMillam Publishing Co. (3rd ed. 1993); conventional processing system network design is more fully discussed in *Data Network Design*, by Darren L. Spohn, McGraw-Hill, Inc. (1993), and conventional data communications is more fully discussed in *Data Communications Principles*, by R. D. Gitlin, J. F. Hayes and S. B. Weinstain, Plenum Press (1992) and in *The Irwin Handbook of Telecommunications*, by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 18:
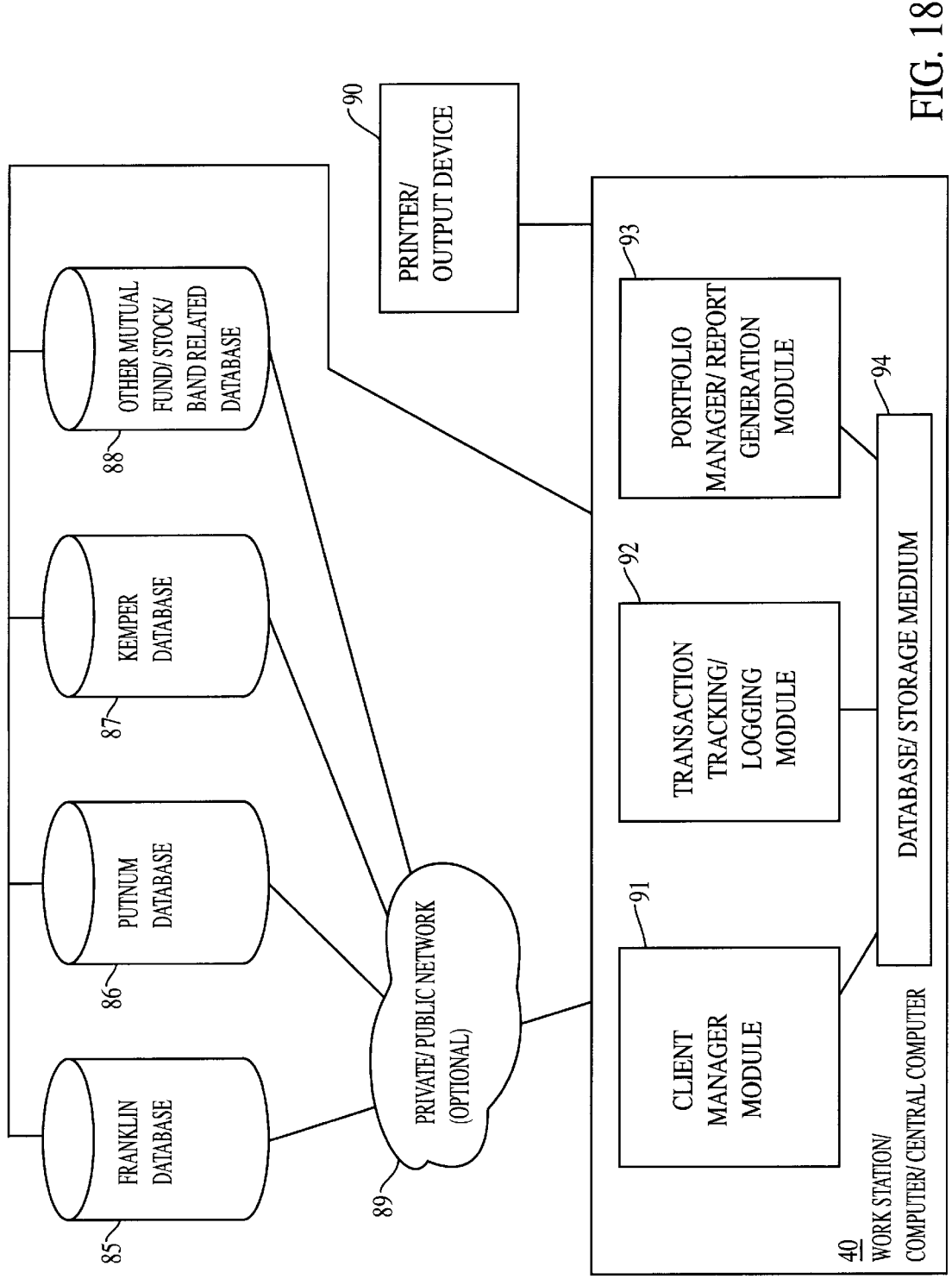
FIG. 18 is an illustration of the functional operation of the main central processing unit illustrated in FIGS. 14–17.

FIG. 18 is an illustration of the functional operation of the main central processing system illustrated in FIGS. 14–17.

In FIG. 18, main central processing unit 40 interfaces with various external databases 85–88 to obtain the necessary information for tracking the performance of the resources. Main central processing unit 40 may be hardwired or directly connected to databases 85–88, or alternatively, access databases 85–88 via a private and/or public network 89.

Main central processing unit 40 is connected to an output device 90 for generating the report for the customer, and possibly the beneficiary. The output device 90 may be a printer, or other output device such as a facsimile, electronic mail, and the like. Main central processing unit 40 includes, for example, a client manager module 91, such as Broker's Ally manufactured by Scherrer Resources, Inc. of Philadelphia, Pa. that may be modified to perform the functions described herein.

Main central processing unit 40 includes, for example, a transaction tracking or logging module 92, such as the functionality provided by the Excel Software package manufactured by Microsoft Corporation that may be modified to perform the functions described herein. Main central processing unit 40 also includes, for example, a portfolio manager/report generator module 91, such as Axys manufactured by Advent Software, Inc. of San Francisco, Calif., that may be modified to perform the functions described herein. Other suitable software packages are also available that may be modified to perform the functions described herein.

Figure 19:
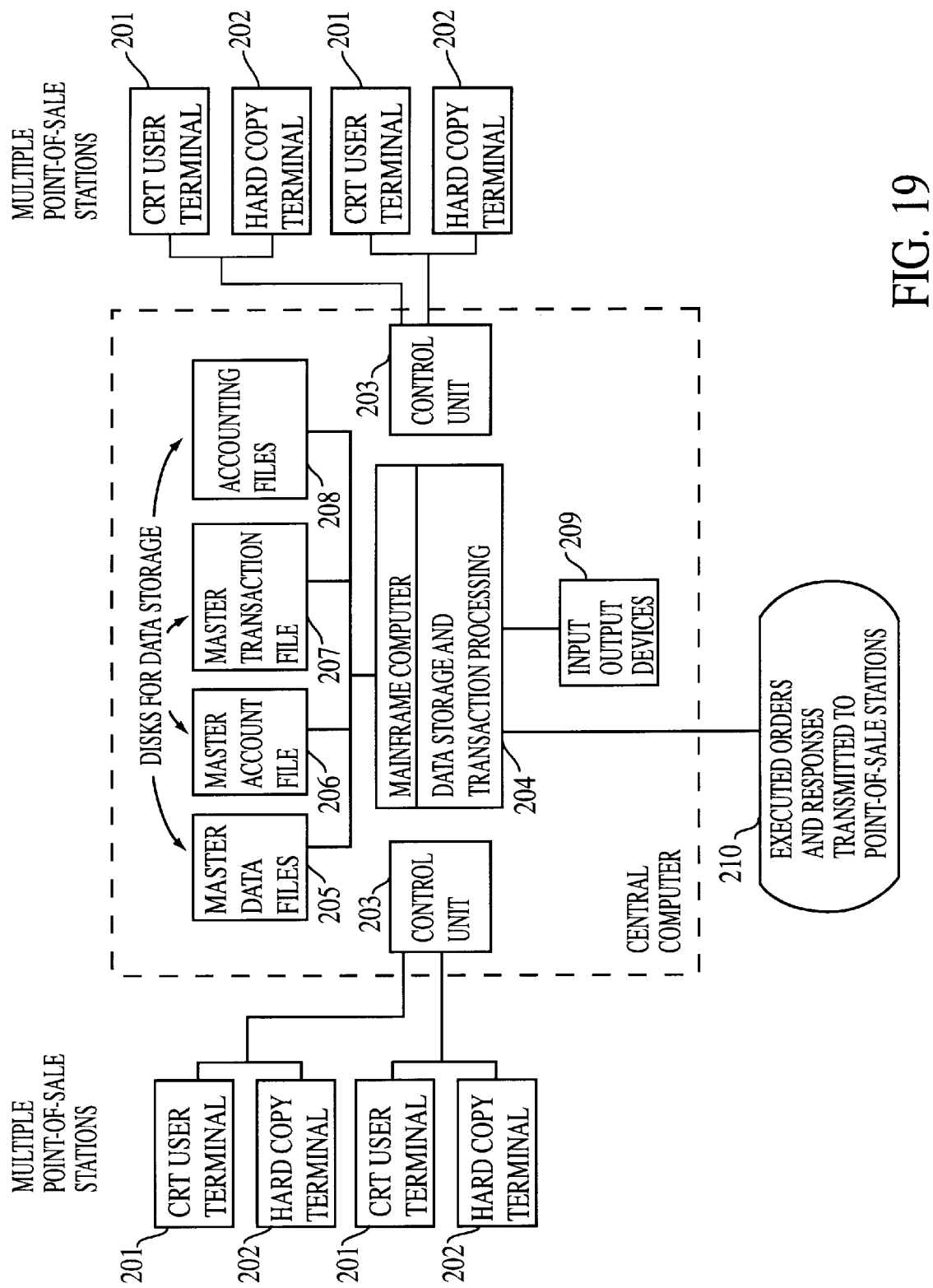
FIG. 19 is a block diagram of an alternative computer system suitable for implementing the invention.

FIG. 19 is a block diagram of an alternative computer system suitable for implementing the invention. At each point-of-sale station, there is a CRT user terminal 201 and associated hard copy terminal 202. The hardware system would include a plurality of these terminals. Each terminal communicates with a central computer 204 through a control unit 203, which controls the point-of-sale terminals, receives purchase orders, redemption orders, and account inquiries from the point-of-sale stations and transmits them to the central computer and receives account verifications, transaction verifications, current market conditions, and responses to customer inquiries regarding account status from the central computer 204 and transmits them to the appropriate point-of-sale stations.

Each control unit could serve up to, for example, approximately 20 point-of-sale stations. The account verifications, transaction verifications, current market conditions, and responses to customer inquiries are transmitted first to the CRT user terminal 201. If the investor requests a written transaction record or a written account status report, the hard copy terminal 202 provides it upon command.

The central computer 204 contains storage space for data relating to transactions that are in process; processes all purchase and redemption transactions; performs the investment portfolio update operation; conducts the management information reporting operation and the period-by-period investment performance monitoring operation; calculates the investment income and taxable income generated periodically in each account; and performs the individual investor record-keeping and reporting operation.

The central computer 204 transmits information to and receives information from the master data files 205 as required in order to retrieve the schedule of contractual early withdrawal penalties, calculate escalation index values, retrieve current and projected market data and current and projected inflation rates, perform the investment portfolio update operation, conduct the management information reporting operation and the period-by-period investment performance monitoring operation, and retrieve the escalation rates needed to calculate an investor's taxable income.

The central computer 204 also transmits information to and receives information from the master account file 206. The central computer 204 also transmits information to and receives information from the master transaction file 207 in connection with purchase and redemption transactions and in connection with management information reporting operation. The central computer 204 also transmits end-of-period financial statements to the accounting files 208 for storage and retrieves these statements from the accounting files 208 when prompted by the input/output devices of the central computer 209.

The system manager has a complement of input/output devices 209. Into the input devices are entered requests for the daily and periodic reports to the fund manager, the management information reports, the period-by-period investment performance reports, and the individual investor reports and instructions for managing and controlling the hardware system and its software. The output devices are used to obtain the daily and periodic reports to the fund manager, the management information reports, the period-by-period investment performance reports, and the individual investor reports.

Figure 20:
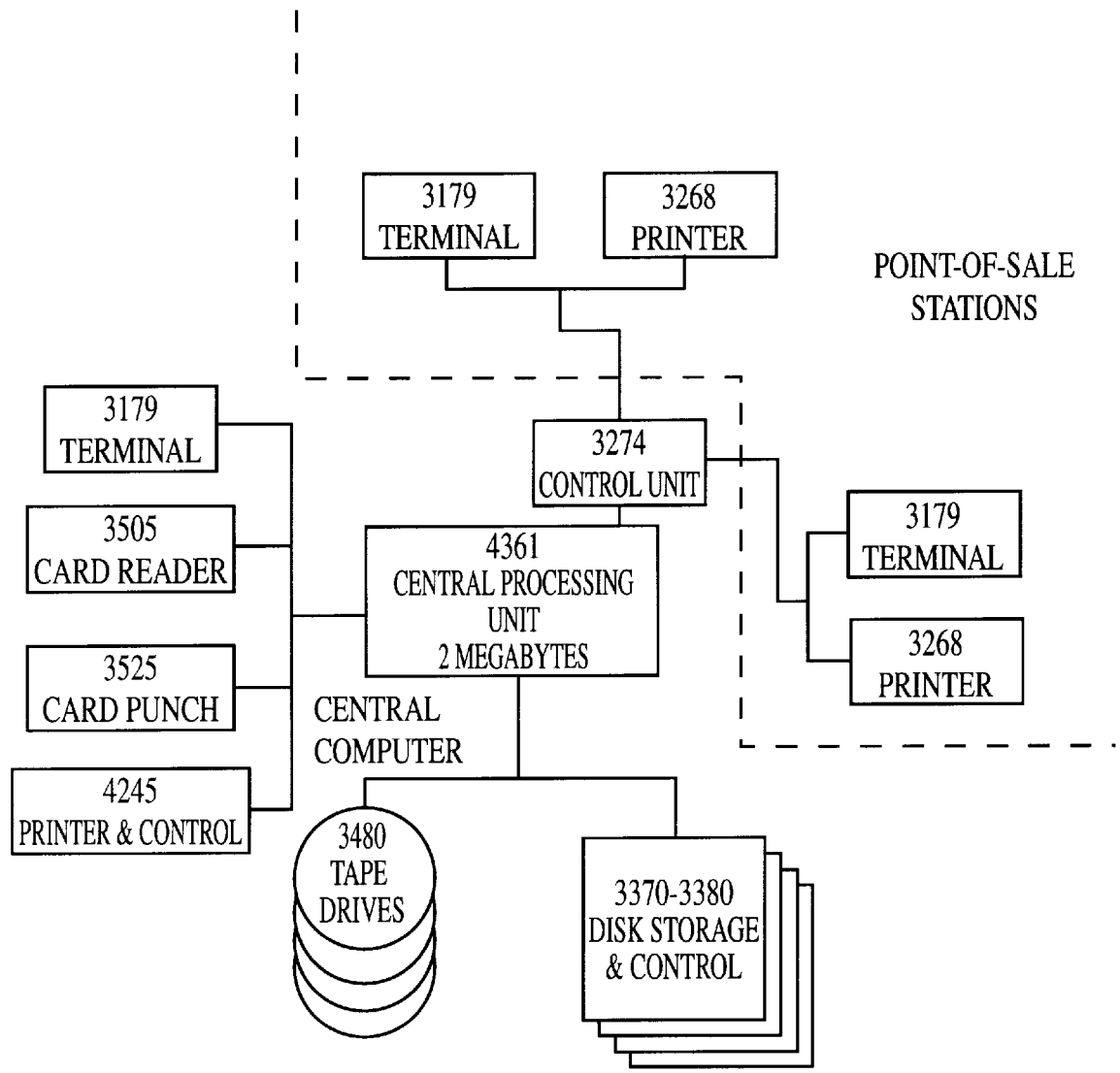
FIG. 20 is a block diagram showing a portion of the computer system of FIG. 19 in more detail.

FIG. 20 is a block diagram showing a portion of the computer system of FIG. 19 in more detail. The exemplary system includes the following types of devices:

| Make Model | Item in FIG. 19 |
| --- | --- |
| IBM 3278 or 3279 or 3179 | CRT user terminal 201 |
| IBM 3268 | Hard copy terminal 202 |
| IBM 3274 | Control unit 203 |
| IBM 4361 | central computer 204 |
| IBM 3370–3380 | disks 205–208 |
| IBM 3420 or 3480 | tape drives 205–208 |
| IBM 3179 | CRT terminal 209 |
| IBM 3505 | card reader 209 |
| IBM 3525 | card punch 209 |
| IBM 4245 | printer 209 |

It is to be understood that there are a large number of commercially available substitutes for each item of hardware which could be combined into fully compatible systems. Accordingly, the scope of the invention is not limited by the particularity of the hardware system described herein.

The methods which are described herein, are implemented, for example, on the hardware system(s) described in FIG. 19 (or other suitable computer system) by embodying the flow-charted routines into a series of software packages that substantially follow the sequence of steps in the flow charts. There are conventional software packages that are commercially available that can also be adapted to perform one or more of the steps described herein. Accordingly, as described below, it would not be necessary in order to implement the invention to write separate software for each step from scratch.

The Point-of Sale software package marketed by International Business Machines (IBM), for example, is a general interactive data package for point-of-sale applications that can be formatted to provide the precise means of receiving customer orders and inquiries, and transmitting the responses to customer inquiries, and the transaction reports.

The Interactive Financial Systems (IFS) library of software packages marketed by IBM, for example, contains a set of general financial and accounting packages that can be adapted and formatted to provide the data base management, accounting, and financial reporting operations required to implement the invention. Part I of IFS contains data base management routines, which can be used to manage the master data files 205, the master account file 206, the master transaction file 207, and the accounting files 208. It also contains routines that can be adapted to handle the account management functions.

Part II of IFS contains general routines that cover general ledger maintenance and the preparation of financial statements and related schedules. It can be adapted and formatted to provide the precise means of preparing the daily transaction summary and summary of current position; the end-of-period investment performance and position report; the end-of-period reports to account holders; the end-of-period financial statements; and the report to the fund manager. Part III of IFS can be adapted to monitor accounts receivable. As an alternative to the IFS software package, the MSA software package produced by Management Science of America can be used.

The VSE/SP software package marketed by IBM contains a complete software package for operating the hardware system diagrammed in FIGS. 19–20. It is possible to write the software needed to implement each of the other routines in one of the available user languages, such as FORTRAN, Pascal, C, C++, and the like, by following the sequence of steps described herein.

Figure 21:
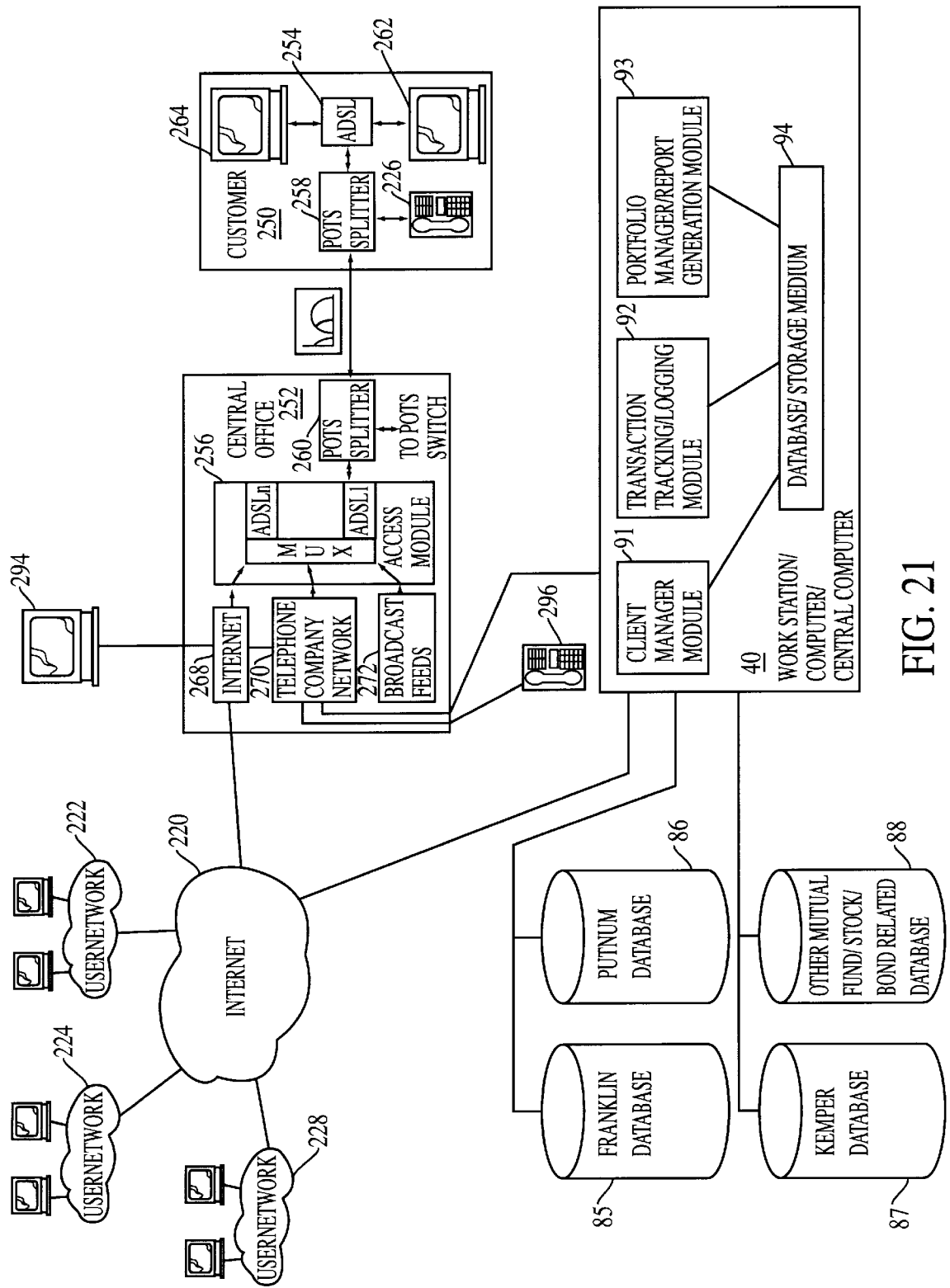
FIG. 21 is an illustration of the architecture of the combined internet, POTS, and ADSL architecture for use in the present invention in accordance with a first embodiment.

FIG. 21 is an illustration of the architecture of the combined internet, POTS, and ADSL architecture for use in the present invention in accordance with a first embodiment. In FIG. 21, to preserve POTS and to prevent a fault in the ADSL equipment 254, 256 from compromising analog voice traffic 226, 296 the voice part of the spectrum (the lowest 4 kHz) is separated from the rest by a passive filter, called a POTS splitter 258, 260. The rest of the available bandwidth—from about 10 kHz to 1 MHz—carries data at rates up to 6 bits per second for every hertz of bandwidth from data equipment 262, 264, 294. The ADSL equipment 256 then has access to a number of destinations including significantly the Internet 268, and other destinations 270, 272.

To exploit the higher frequencies, ADSL makes use of advanced modulation techniques, of which the best known is the discrete multitone (DMT) technology. As its name implies, ADSL transmits data asymmetrically—at different rates upstream toward the central office 252 and downstream toward the subscriber 250.

Cable television providers are providing analogous Internet service to PC users over their TV cable systems by means of special cable modems. Such modems are capable of transmitting up to 30 Mb/s over hybrid fiber/coax systems, which use fiber to bring signals to a neighborhood and coax to distribute it to individual subscribers.

Cable modems come in many forms. Most create a downstream data stream out of one of the 6-MHz TV channels that occupy spectrum above 50 MHz (and more likely 550 MHz) and carve an upstream channel out of the 5–50-MHz band, which is currently unused. Using 64-state quadrature amplitude modulation (64 QAM), a downstream channel can realistically transmit about 30 Mb/s (the oft-quoted lower speed of 10 Mb/s refers to PC rates associated with Ethernet connections). Upstream rates differ considerably from vendor to vendor, but good hybrid fiber/coax systems can deliver upstream speeds of a few megabits per second. Thus, like ADSL, cable modems transmit much more information downstream than upstream.

The internet architecture 220 and ADSL architecture 354, 356 may also be combined with, for example, user networks 222, 224, and 228. As illustrated in this first embodiment, users may access or use or participate in the administration, management computer assisted program in computer 40 via various different access methods. In this first embodiment, the various databases are only accessible via access to and/or by computer system 40.

Figure 22:
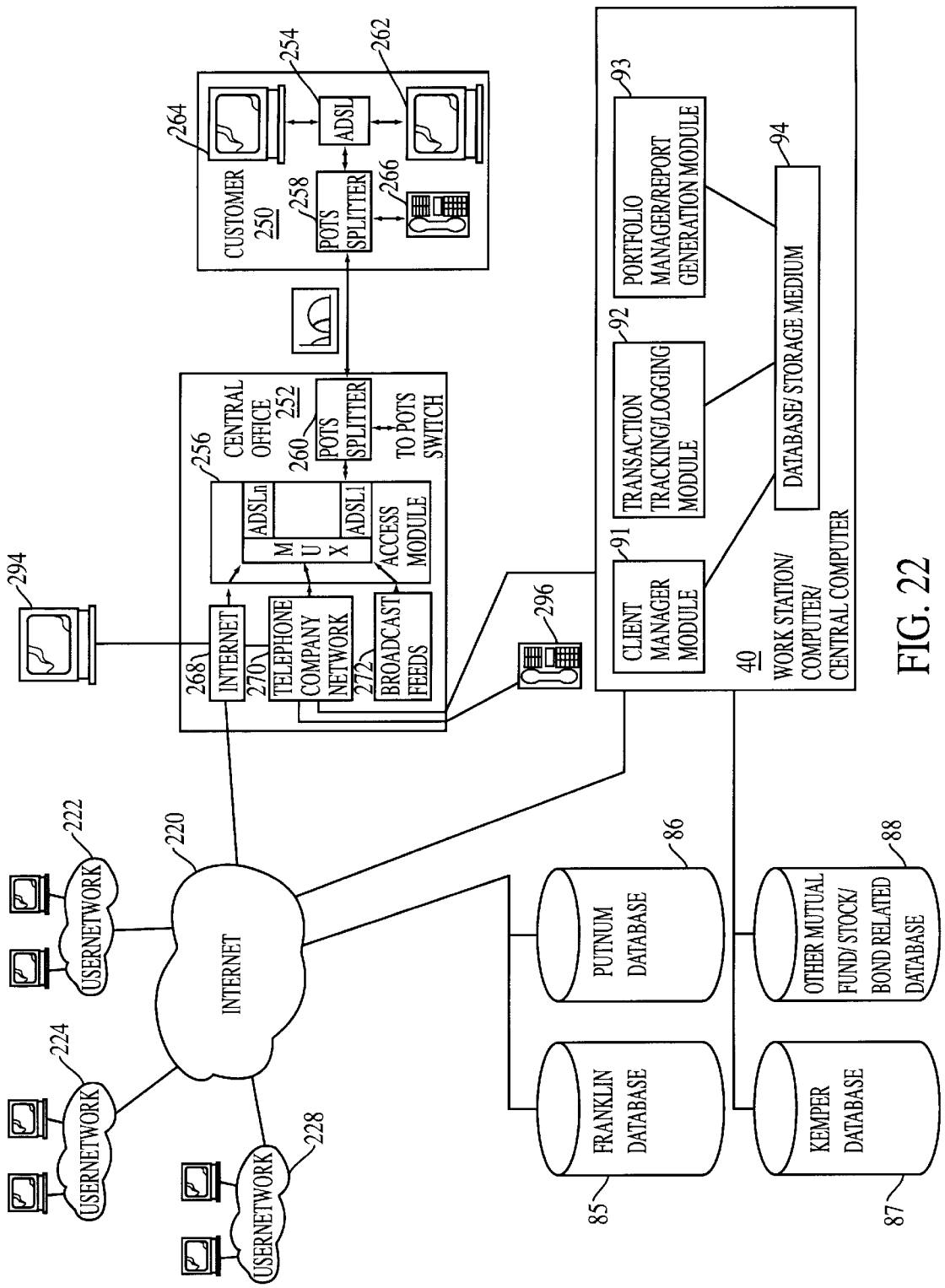
FIG. 22 is an illustration of the architecture of the combined internet, POTS, and ADSL architecture for use in the present invention in accordance with a second embodiment.

FIG. 22 is an illustration of the architecture of the combined internet, POTS, and ADSL architecture for use in the present invention in accordance with a second embodiment. As illustrated in this second embodiment, users may access or use or participate in the administration, management computer assisted program in computer 40 via various different access methods. In this second embodiment, some databases (e.g., 87, 88) are only accessible via access to and/or by computer system 40, and other databases (e.g., 85, 86) are only accessible via access to and/or by internet 220.

Figure 23:
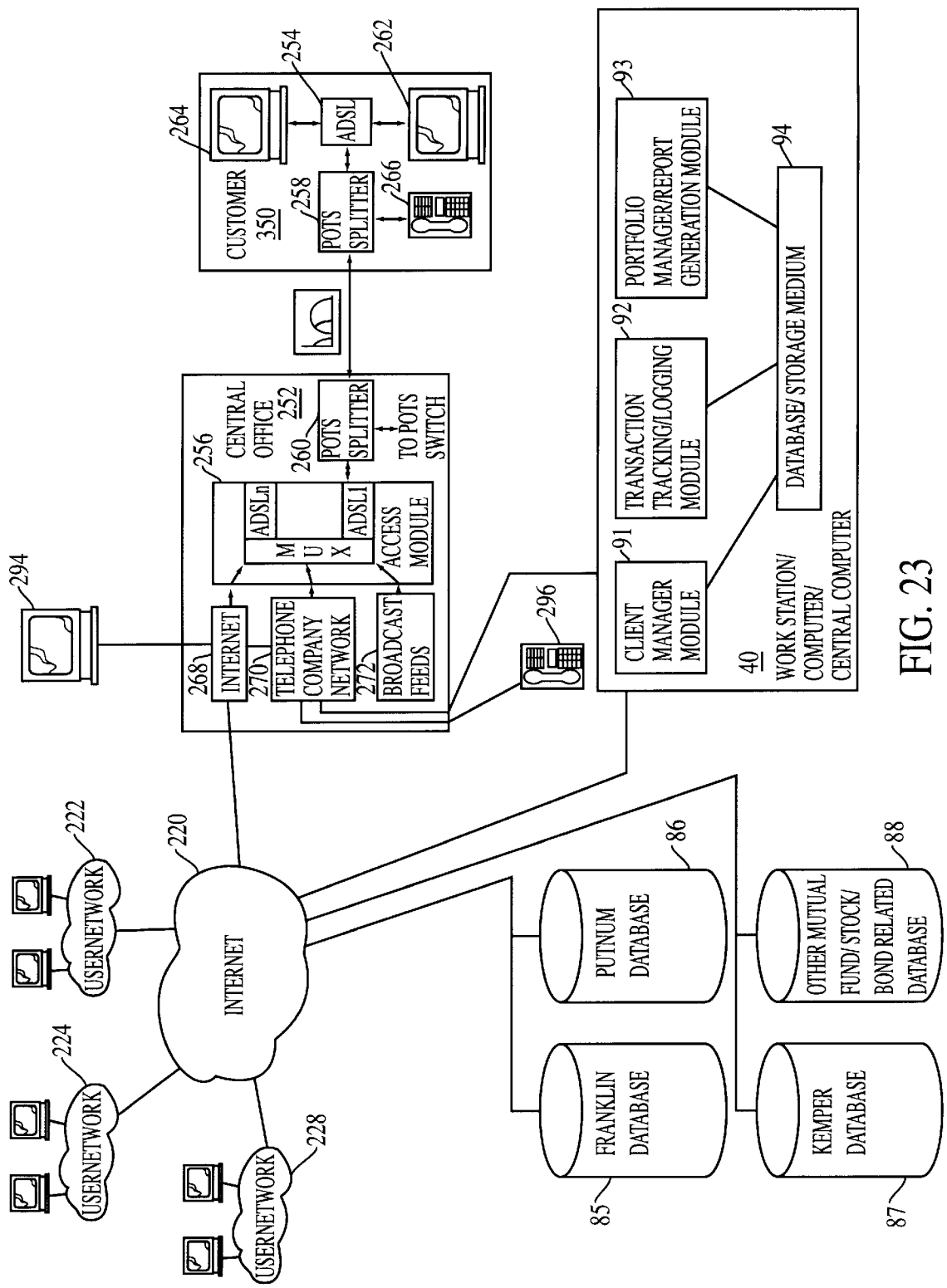
FIG. 23 is an illustration of the architecture of the combined internet, POTS, and ADSL architecture for use in the present invention in accordance with a third embodiment.

FIG. 23 is an illustration of the architecture of the combined internet, POTS, and ADSL architecture for use in the present invention in accordance with a third embodiment. As illustrated in this third embodiment, users may access or use or participate in the administration, management computer assisted program in computer 40 via various different access methods. In this third embodiment, the databases (e.g., 85, 86, 87 and/or 88) are only accessible via access to and/or by internet 220.

Figure 24:
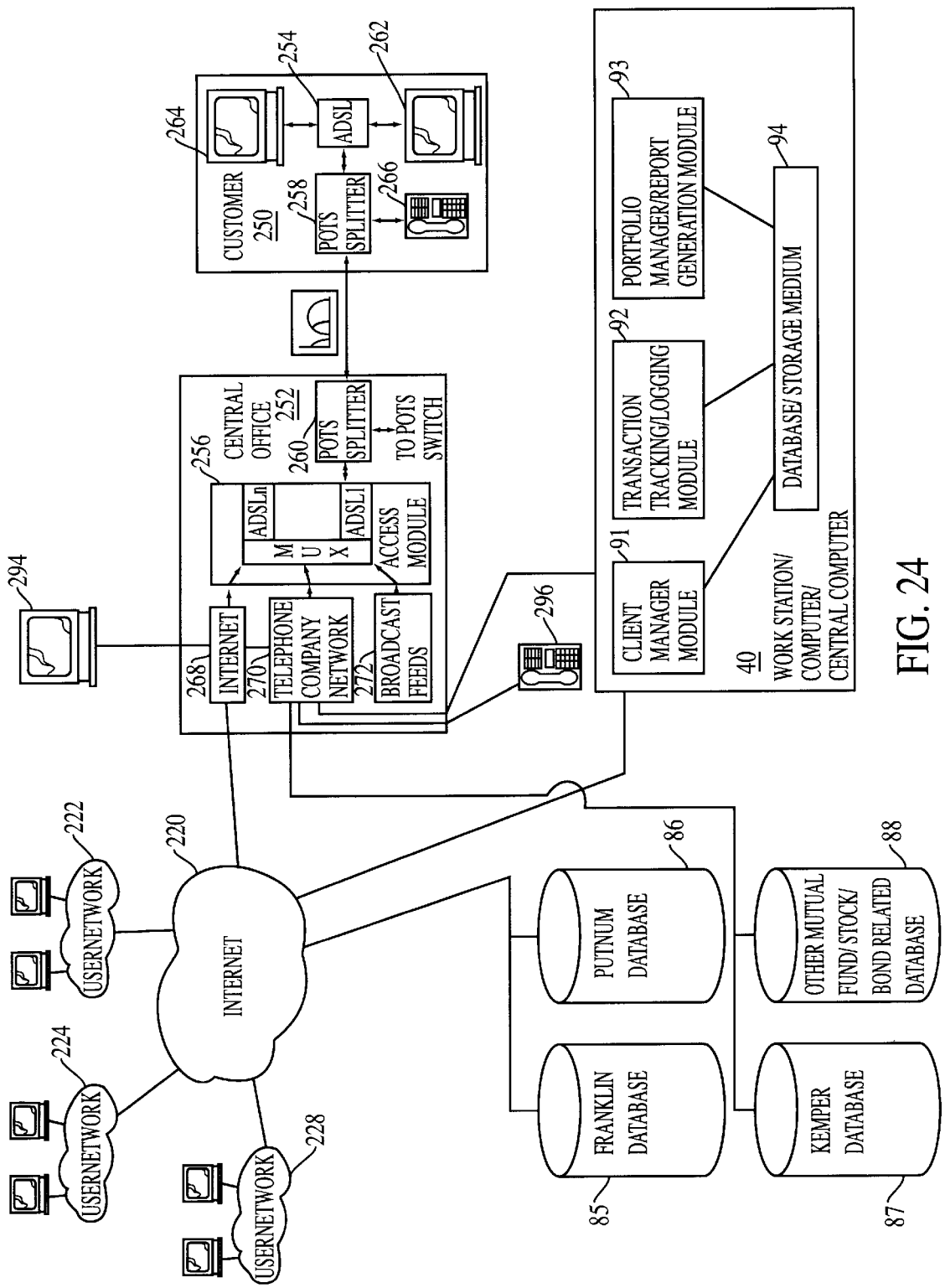
FIG. 24 is an illustration of the architecture of the combined internet, POTS, and ADSL architecture for use in the present invention in accordance with a fourth embodiment.

FIG. 24 is an illustration of the architecture of the combined internet, POTS, and ADSL architecture for use in the present invention in accordance with a fourth embodiment. As illustrated in this fourth embodiment, users may access or use or participate in the administration, management computer assisted program in computer 40 via various different access methods. In this fourth embodiment, some databases (e.g., 87, 88) are only accessible via access to and/or by ADSL system 256 via interface network 270, and other databases (e.g., 85, 86) are only accessible via access to and/or by internet 220.

The above embodiments are only to be construed as examples of the various different types of computer systems that may be utilized in connection with the computer assisted-implemented process for managing and/or administering the retirement and/or investment resources.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes, including:

(a) receiving, by the user, a request from the customer to administer the resources in accordance with predetermined criteria;

(b) storing, by the computer, customer related data associated with the customer;

(c) at least one of receiving and acknowledging, by the user with the assistance of the computer, receipt of the resources from the customer, and entering the resources into the computer for administration;

(d) appointing, by the user, a trustee to administer and manage the resources;

(e) determining, by at least one of the user and the computer, a predetermined period of time based on an age of the beneficiary at which withdrawals do not incur a tax penalty;

(f) administering, by the trustee with the assistance of the computer, the resources including allocating of the resources in an annuity investment growing tax deferred for at least one of the predetermined period of time and until occurrence of a predetermined event, wherein the predetermined event enables withdrawals without incurring tax penalty;

(g) tracking performance of the resources;

(h) transmitting, by at least one of the trustee and user with the assistance of the computer, details of the administration of the resources to at least one of the beneficiary and the customer;

(i) requesting, by the beneficiary, to at least one of the trustee and user to withdraw the resources;

(j) determining, by at least one of the trustee and the user with the assistance of the computer, whether an initial period of time has expired;

(k) rejecting, by at least one of the user and the trustee with the assistance of the computer, the request of the beneficiary when the initial period of time has expired and when the predetermined period of time has not expired and when the predetermined event has not occurred, and returning to said administering step (f), wherein at least one of the user and the trustee thereby prevents withdrawal of resources so that the resources may grow tax-deferred for at least one of the predetermined period of time and until the occurrence of the predetermined event, ensuring that the resources are not prematurely diverted and preventing the growth of the resources from being compromised;

(l) transmitting, by at least one of the user and the trustee with the assistance of the computer, the resources to the beneficiary when the initial period of time has not expired; and (m) transmitting, by at least one of the user and the trustee with the assistance of the computer, the resources in accordance with the predetermined criteria to the beneficiary when the initial period of time has expired and when the predetermined period of time has at least one of expired and when the predetermined event has occurred.

2. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) receiving a request from the customer to administer the resources in accordance with predetermined criteria;

(b) storing customer related data associated with the customer;

(c) at least one of receiving and acknowledging receipt of the resources from the customer, and entering the resources into the computer for administration;

(d) determining a predetermined period of time based on an age of the beneficiary at which withdrawals do not incur a tax penalty;

(e) administering the resources including allocating of the resources in an annuity investment for the predetermined period of at least one time and until occurrence of a predetermined event;

(f) tracking performance of the resources;

(g) transmitting details of the administration of the resources to at least one of the beneficiary and the customer;

(h) receiving a request to withdraw the resources;

(i) determining whether an initial period of time has expired;

(j) rejecting the request of the beneficiary when the initial period of time has expired and when the predetermined period of time has not expired and when the predetermined event has not occurred, and returning to said administering step (e);

(l) transmitting the resources to the beneficiary when the initial period of time has not expired; and (m) transmitting the resources in accordance with the predetermined criteria to the beneficiary when the initial period of time has expired and when the predetermined period of time has at least one of expired and when the predetermined event has occurred.

3. A computer program product in accordance with claim 2, wherein the predetermined event enables withdrawals without incurring tax penalty.

4. A computer program product in accordance with claim 2, wherein the resources grow tax deferred for the predetermined period of time.

5. A computer program product in accordance with claim 2, wherein the rejecting (j) instruction prevents withdrawal of resources so that the resources may grow tax-deferred for at least one of the predetermined period of time and until the occurrence of the predetermined event, ensuring that the resources are not prematurely diverted, and preventing the growth of the resources from being compromised.

6. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising;

a recording medium readable by the computer; and the computer instructions stored on said recording medium instructing the computer to perform the first process, the instructions and the first and second processes including;

(a) receiving, by the user, a request from the customer to administer the resources in accordance with predetermined criteria;

(b) storing, by the computer, customer related data associated with the customer;

(c) determining, by at least one of the user and the computer, a predetermined period of time based on an age of the beneficiary at which withdrawals do not incur a tax penalty;

(d) administering, by the trustee with the assistance of the computer, the resources including allocating of the resources in an annuity investment growing tax deferred for at least one of the predetermined period of time and until occurrence of a predetermined event;

(e) requesting, by the beneficiary, to at least one of the trustee and the user to withdraw the resources;

(f) rejecting, by at least one of the user and the trustee with the assistance of the computer, the request of the beneficiary when the initial period of time has expired and when the predetermined period of time has not expired and when the predetermined event has not occurred, and returning to said administering step (d); and (g) transmitting, by at least one of the user and the trustee with the assistance of the computer, the resources in accordance with the predetermined criteria to the beneficiary when the initial period of time has expired and when at least one of the predetermined period of time has expired and when the predetermined event has occurred.

7. A computer program product in accordance with claim 6, wherein the predetermined event enables withdrawals without incurring tax penalty.

8. A computer program product in accordance with claim 6, wherein the resources grow tax deferred for the predetermined period of time.

9. A computer program product in accordance with claim 6, wherein the rejecting (f) instruction prevents withdrawal of resources so that the resources may grow tax-deferred for at least one of the predetermined period of time and until the occurrence of the predetermined event, ensuring that the resources are not prematurely diverted, and preventing the growth of the resources from being compromised.

10. A computer program product storing computer instructions therein for instructing a computer to perform a first process of at least one of administering and assisting in the administration of resources of a customer for the benefit of a beneficiary via the assistance of a user optionally including an administrator performing a second process, the program product comprising:

a recording medium readable by the computer; and the computer instructions stored on said recording medium instructing the computer to perform the first process, the instructions and the first and second processes including:

(a) receiving, by the user, a request from the customer to administer the resources in accordance with predetermined criteria;

(b) storing, by the computer, customer related data associated with the customer;

(c) determining, by at least one of the user and the computer, a predetermined period of time based on an age of the beneficiary at which withdrawals do not incur a tax penalty; and (d) administering, by the trustee with the assistance of the computer, the resources including allocating of the resources in an annuity investment growing tax deferred for at least one of the predetermined period of time and until occurrence of a predetermined event, and preventing withdrawal of the resources so that the resources may grow tax-deferred for at least one of the predetermined period of time and until the occurrence of the predetermined event, ensuring that the resources are not prematurely diverted, and preventing the tax-free growth of the resources from being compromised.

11. A computer implemented and user assisted process including a program product storing computer instructions therein for instructing a computer to perform a first process of at least one of administering and assisting in the administration of resources of a customer for the benefit of a beneficiary via the assistance of a user optionally including an administrator performing a second process, the program product including a recording medium readable by the computer, and the computer instructions stored on said recording medium instructing the computer to perform the first process, the first and second processes comprising the steps of:

(a) receiving, by the user, a request from the customer to administer the resources in accordance with predetermined criteria;

(b) storing, by the computer, customer related data associated with the customer;

(c) determining, by at least one of the user and the computer, a predetermined period of time based on an age of the beneficiary at which withdrawals do not incur a tax penalty; and (d) administering, by a trustee with the assistance of the computer, the resources including allocating of the resources in an annuity investment growing tax deferred for at least one of the predetermined period of time and until occurrence of a predetermined event, and preventing withdrawal of the resources so that the resources may grow tax-deferred for at least one of the predetermined period of time and until the occurrence of the predetermined event, ensuring that the resources are not prematurely diverted, and preventing the tax-free growth of the resources from being compromised.

12. A computer system including a program product storing computer instructions therein for instructing the computer system to perform a first process of at least one of administering and assisting in the administration of resources of a customer for the benefit of a beneficiary via the assistance of a user optionally including an administrator performing a second process, the program product including a recording medium readable by the computer, and the computer instructions stored on said recording medium instructing the computer to perform the first process, the computer system comprising:

means for receiving, by the user, a request from the customer to administer the resources in accordance with predetermined criteria;

means for storing, by the computer, customer related data associated with the customer;

means for determining, by at least one of the user and the computer, a predetermined period of time based on an age of the beneficiary at which withdrawals do not incur a tax penalty; and means for administering, by the trustee with the assistance of the computer, the resources including allocating of the resources in an annuity investment growing tax deferred for at least one of the predetermined period of time and until occurrence of a predetermined event, and preventing withdrawal of the resources so that the resources may grow tax-deferred for at least one of the predetermined period of time and until the occurrence of the predetermined event, ensuring that the resources are not prematurely diverted, and preventing the tax-free growth of the resources from being compromised.

13. A computer implemented and user assisted process including a program product storing computer instructions therein for instructing a computer to perform a first process of at least one of administering and assisting in the administration of resources of a customer for the benefit of a beneficiary via the assistance of a user optionally including an administrator performing a second process, the program product including a recording medium readable by the computer, and the computer instructions stored on said recording medium instructing the computer to perform the first process, the first and second processes comprising the steps of:

(a) receiving, by the user, a request from the customer to administer the resources in accordance with predetermined criteria for an annuity investment under a trust with a trustee managing the annuity investment;

(b) storing, by the computer, customer related data associated with the customer;

(c) determining, by at least one of the user and the computer, a predetermined period of time based on an age of the beneficiary at which withdrawals do not incur a tax penalty; and (d) administering, by the trustee with the assistance of the computer, the resources including allocating of the resources in the annuity investment growing tax deferred for at least one of the predetermined period of time and until occurrence of a predetermined event to accumulate an arbitrary amount, and preventing withdrawal of the resources via the trust so that the resources may grow tax-deferred for at least one of the predetermined period of time and until the occurrence of the predetermined event, ensuring that the resources are not prematurely diverted, and preventing the tax-free growth of the resources from being compromised.

* * * * *

UNITED STATES PATENT AND TRADEMARK OFFICE
CERTIFICATE OF CORRECTION

PATENT NO. : 6,085,174

DATED : 4 July 2000

INVENTOR(S) :
    Rick EDELMAN

It is certified that error appears in the above-identified patent and that said Letters Patent is hereby corrected as shown below:

Insert the following References Cited on the Title Page [56]:
--

| | | | |
|---|---|---|---|
| 5,644,727 | 7/1997 | Atkins | 705/40; |
| 5,787,404 | 7/1998 | Fernandez-Holmann | 705/35; |
| 5,852,811 | 12/1998 | Atkins | 705/36; |
| 5,864,685 | 1/1999 | Hagan | 705/35; |
| 5,875,437 | 2/1999 | Atkins | 705/40;-- |

Signed and Sealed this

Seventeenth Day of April, 2001

Attest:

NICHOLAS P. GODICI

Attesting Officer     *Acting Director of the United States Patent and Trademark Office*